US00RE41247E

(19) United States
(12) Reissued Patent
Braun et al.

(10) Patent Number: US RE41,247 E
(45) Date of Reissued Patent: Apr. 20, 2010

(54) OPTICAL TRANSPORT SYSTEM

(75) Inventors: Steve W. Braun, Leucadia, CA (US); Henri Hodara, Dana Point, CA (US); John J. Soderberg, Acworth, GA (US); G. Allan Whittaker, Alpharetta, GA (US)

(73) Assignee: Lockheed Martin Corporation, Bethesda, MD (US)

(21) Appl. No.: 09/820,973

(22) Filed: Mar. 29, 2001

Related U.S. Patent Documents

Reissue of:
(64) Patent No.: 5,898,801
Issued: Apr. 27, 1999
Appl. No.: 09/014,079
Filed: Jan. 29, 1998

U.S. Applications:
(63) Continuation-in-part of application No. 08/831,375, filed on Apr. 1, 1997, now Pat. No. 5,901,260.

(51) Int. Cl.
*G02B 6/28* (2006.01)
*H04B 10/20* (2006.01)

(52) U.S. Cl. ..... 385/24; 359/119; 359/127; 359/134

(58) Field of Classification Search ..... 385/17, 385/24, 27, 31, 37, 45, 47; 372/6; 359/115, 359/119, 127, 134, 143, 125, 137
See application file for complete search history.

(56) References Cited

U.S. PATENT DOCUMENTS 3,883,217 A 5/1975 Love et al.
3,887,876 A 6/1975 Zeidler
3,936,141 A 2/1976 Milton
3,943,358 A 3/1976 Reymond et al.
4,054,366 A 10/1977 Barnoski et al.

(Continued)

FOREIGN PATENT DOCUMENTS

DE 30 07 958 9/1981

(Continued)

OTHER PUBLICATIONS

Cisco Wavelength Router Manager—Data Sheet, www.cisco.com/warp/public/cc/so/neso/olso/cwrm_ds.htm (Apr. 25, 2001).

(Continued)

*Primary Examiner*—Frank G. Font
*Assistant Examiner*—Eric Wong
(74) *Attorney, Agent, or Firm*—Kilpatrick Stockton LLP

(57) ABSTRACT

A bi-directional, redundant, optical transport system is configured to provide a non-blocking, bi-directional, multi-channel, protocol independent optical transport system for the simultaneously transfer of digital, analog, and discrete data between a plurality data terminal equipment. The optical transport system includes a light transmission line for transmitting light bi-directionally and a plurality of nodes, connected in series by the light transmission line for receiving, extracting and passing signal light. Each node comprises: data terminal equipment for issuing and receiving electrical signals; an electro-optical interface device, associated the data terminal equipment, for converting electrical signals issued by the associated data terminal to signal light for insertion onto the light transmission light and for converting signal light, extracted from the light transmission line into electrical signals to be received by the associated data terminal; a translation logic device connected between the optical interface device and the data terminal equipment, for performing required protocol translation for the data terminal equipment and an optical interface device, connected to the electro-optical interface device and the light transmission line, for extracting signal light from the light transmission line to be converted into electrical signals by the electro-optical interface device for recipient by the data terminal equipment, for inserting, onto the light transmission line, signal light received from the electro-optical interface device and for passing signal light bi-directionally on the light transmission line.

82 Claims, 16 Drawing Sheets

U.S. PATENT DOCUMENTS

| | | | | | |
|---|---|---|---|---|---|
| 4,166,946 | A | | 9/1979 | Chown et al. | |
| 4,234,969 | A | | 11/1980 | Singh | |
| 4,249,266 | A | | 2/1981 | Nakamori | |
| 4,301,543 | A | | 11/1981 | Palmer | |
| 4,307,933 | A | | 12/1981 | Palmer et al. | |
| 4,317,614 | A | | 3/1982 | Palmer | |
| 4,366,565 | A | | 12/1982 | Herskowitz | |
| 4,367,460 | A | | 1/1983 | Hodara | |
| 4,400,054 | A | | 8/1983 | Biard et al. | |
| 4,423,922 | A | | 1/1984 | Porter | |
| 4,435,849 | A | | 3/1984 | Ilgner et al. | |
| 4,446,515 | A | | 5/1984 | Sauer et al. | |
| 4,457,581 | A | | 7/1984 | Johnson et al. | |
| 4,482,980 | A | | 11/1984 | Korowitz et al. | |
| 4,506,153 | A | | 3/1985 | Ohno | |
| 4,543,574 | A | | 9/1985 | Takagi et al. | |
| 4,545,074 | A | | 10/1985 | Balliet et al. | |
| 4,554,511 | A | | 11/1985 | Braun | |
| 4,577,184 | A | | 3/1986 | Hodara et al. | |
| 4,595,839 | A | | 6/1986 | Braun et al. | |
| 4,630,256 | A | | 12/1986 | Albanese | |
| 4,654,890 | A | | 3/1987 | Hasegawa et al. | |
| 4,671,608 | A | | 6/1987 | Konishi | |
| 4,674,830 | A | | 6/1987 | Shaw et al. | |
| 4,705,350 | A | | 11/1987 | Cheng | |
| 4,715,012 | A | | 12/1987 | Mueller, Jr. | |
| 4,717,229 | A | | 1/1988 | Cutler | |
| 4,731,784 | A | | 3/1988 | Keller et al. | |
| 4,739,183 | A | | 4/1988 | Tokura et al. | |
| 4,756,595 | A | | 7/1988 | Braun et al. | |
| 4,759,011 | A | | 7/1988 | Hicks, Jr. | |
| 4,761,833 | A | | 8/1988 | Epworth | |
| 4,786,130 | A | | 11/1988 | Georgiou et al. | |
| 4,810,052 | A | | 3/1989 | Fling | |
| 4,829,593 | A | | 5/1989 | Hara | |
| 4,845,483 | A | | 7/1989 | Negishi | |
| 4,850,047 | A | | 7/1989 | Iguchi et al. | |
| 4,883,335 | A | | 11/1989 | Alferness et al. | |
| 4,885,589 | A | | 12/1989 | Edward et al. | |
| 4,898,565 | A | | 2/1990 | Braun | |
| 4,932,004 | A | | 6/1990 | Hodara et al. | |
| 4,946,244 | A | | 8/1990 | Schembri | |
| 4,947,134 | A | | 8/1990 | Olsson | |
| 4,948,218 | A | | 8/1990 | Kobayashi et al. | |
| 4,958,354 | A | | 9/1990 | Urakami et al. | |
| 4,959,837 | A | * | 9/1990 | Fevrier et al. | 372/6 |
| 5,029,306 | A | | 7/1991 | Bull et al. | |
| 5,046,137 | A | | 9/1991 | Kurobe et al. | |
| 5,055,827 | A | | 10/1991 | Philipp | |
| 5,058,101 | A | | 10/1991 | Albanese et al. | |
| 5,058,974 | A | * | 10/1991 | Mollenauer | 385/27 |
| 5,080,505 | A | | 1/1992 | Epworth | |
| 5,083,874 | A | * | 1/1992 | Aida et al. | 385/24 |
| 5,117,196 | A | | 5/1992 | Epworth et al. | |
| 5,117,303 | A | | 5/1992 | Desurvire et al. | |
| 5,129,019 | A | | 7/1992 | Robberg et al. | |
| 5,133,031 | A | | 7/1992 | Tanaka et al. | |
| 5,179,603 | A | | 1/1993 | Hall et al. | |
| 5,181,134 | A | | 1/1993 | Fatehi et al. | |
| 5,185,735 | A | | 2/1993 | Ernst | |
| 5,187,605 | A | | 2/1993 | Shikata et al. | |
| 5,189,541 | A | | 2/1993 | Konishi | |
| 5,212,577 | A | | 5/1993 | Nakamura et al. | |
| 5,222,166 | A | | 6/1993 | Weltha | |
| 5,267,071 | A | | 11/1993 | Little et al. | |
| 5,283,687 | A | | 2/1994 | Hsu et al. | |
| 5,296,957 | A | | 3/1994 | Takahashi et al. | |
| 5,307,197 | A | | 4/1994 | Tanabe et al. | |
| 5,309,564 | A | | 5/1994 | Bradley et al. | |
| 5,315,424 | A | | 5/1994 | Boden et al. | |
| 5,317,580 | A | | 5/1994 | Auffret et al. | |
| 5,319,642 | A | | 6/1994 | Ota | |
| 5,345,230 | A | | 9/1994 | Jackson et al. | |
| 5,347,384 | A | | 9/1994 | McReynolds et al. | |
| 5,361,262 | A | | 11/1994 | Cheung | |
| 5,363,367 | A | | 11/1994 | Kobayashi et al. | |
| 5,369,516 | A | | 11/1994 | Uchida | |
| 5,392,154 | A | | 2/1995 | Lin et al. | |
| 5,412,746 | A | | 5/1995 | Rossberg et al. | |
| 5,414,416 | A | | 5/1995 | Yamakita et al. | |
| 5,424,864 | A | | 6/1995 | Emura | |
| 5,432,874 | A | | 7/1995 | Muraguchi | |
| 5,434,861 | A | | 7/1995 | Pritty et al. | |
| 5,471,342 | A | | 11/1995 | Junginger et al. | |
| 5,479,082 | A | | 12/1995 | Calvani et al. | |
| 5,481,478 | A | | 1/1996 | Palmieri et al. | |
| 5,483,233 | A | | 1/1996 | Pettitt et al. | |
| 5,500,857 | A | * | 3/1996 | Nakata | 370/440 |
| 5,500,867 | A | | 3/1996 | Krasulick | |
| 5,502,589 | A | | 3/1996 | Yamamoto et al. | |
| 5,506,709 | A | | 4/1996 | Segal et al. | |
| 5,508,689 | A | | 4/1996 | Rado et al. | |
| 5,517,622 | A | | 5/1996 | Ivanoff et al. | |
| 5,528,408 | A | | 6/1996 | McGinley et al. | |
| 5,533,153 | A | | 7/1996 | Ota | |
| 5,539,558 | A | | 7/1996 | Yonemura et al. | |
| 5,541,957 | A | | 7/1996 | Lau | |
| 5,548,431 | A | | 8/1996 | Shin et al. | |
| 5,552,921 | A | | 9/1996 | Hetzel et al. | |
| 5,572,612 | A | * | 11/1996 | Delavaux et al. | 385/24 |
| 5,615,290 | A | | 3/1997 | Harasawa et al. | |
| 5,623,169 | A | | 4/1997 | Sugimoto et al. | |
| 5,664,035 | A | | 9/1997 | Tsuji et al. | |
| 5,684,899 | A | | 11/1997 | Ota | |
| 5,712,932 | A | | 1/1998 | Alexander et al. | |
| 5,712,937 | A | | 1/1998 | Asawa et al. | |
| 5,717,795 | A | | 2/1998 | Sharma et al. | |
| 5,732,086 | A | | 3/1998 | Liang et al. | |
| 5,739,938 | A | | 4/1998 | Goutzoulis et al. | |
| 5,745,479 | A | | 4/1998 | Burns et al. | |
| 5,764,821 | A | | 6/1998 | Glance | |
| 5,777,581 | A | | 7/1998 | Lilly et al. | |
| 5,778,118 | A | | 7/1998 | Sridhar | |
| 5,793,908 | A | | 8/1998 | Mizuochi et al. | |
| 5,796,890 | A | | 8/1998 | Tsuji et al. | |
| 5,801,865 | A | | 9/1998 | Weis et al. | |
| 5,809,187 | A | | 9/1998 | Peck, Jr. et al. | |
| 5,815,294 | A | | 9/1998 | Ishikawa et al. | |
| 5,825,515 | A | | 10/1998 | Anderson | |
| 5,825,949 | A | | 10/1998 | Choy et al. | |
| 5,838,989 | A | | 11/1998 | Hutchison et al. | |
| 5,854,698 | A | | 12/1998 | Eskildsen et al. | |
| 5,866,898 | A | * | 2/1999 | Hodgson et al. | 250/227.14 |
| 5,880,863 | A | | 3/1999 | Rideout et al. | |
| 5,894,362 | A | | 4/1999 | Onaka et al. | |
| 5,896,417 | A | | 4/1999 | Lau | |
| 5,898,673 | A | | 4/1999 | Riggan et al. | |
| 5,898,801 | A | | 4/1999 | Braun et al. | |
| 5,901,260 | A | | 5/1999 | Braun | |
| 5,910,851 | A | | 6/1999 | Flaherty | |
| 5,937,032 | A | | 8/1999 | Nummelin et al. | |
| 5,943,148 | A | | 8/1999 | Hamel et al. | |
| 5,949,560 | A | | 9/1999 | Roberts et al. | |
| 5,959,412 | A | | 9/1999 | Ushijima | |
| 5,995,258 | A | | 11/1999 | Weber et al. | |
| 6,008,915 | A | | 12/1999 | Zyskind | |
| 6,014,481 | A | | 1/2000 | Kremers | |
| 6,075,628 | A | | 6/2000 | Fisher et al. | |
| 6,075,648 | A | | 6/2000 | Yamamoto et al. | |
| 6,084,233 | A | | 7/2000 | Hodgson et al. | |
| 6,111,888 | A | | 8/2000 | Green et al. | |

| | | | |
|---|---|---|---|
| 6,122,095 | A | 9/2000 | Fatehi |
| 6,128,111 | A | 10/2000 | Roberts |
| 6,140,920 | A | 10/2000 | Roberts |
| 6,157,725 | A | 12/2000 | Becker |
| 6,175,533 | B1 | 1/2001 | Luk et al. |
| 6,345,137 | B1 | 2/2002 | Imajo |
| 6,385,366 | B1 | 5/2002 | Lin |
| 6,426,815 | B1 | 7/2002 | Koehler |
| 6,449,072 | B1 | 9/2002 | Sian et al. |
| 6,499,027 | B1 | 12/2002 | Weinberger |
| 6,502,131 | B1 | 12/2002 | Vaid et al. |
| 6,567,197 | B1 | 5/2003 | Glance |
| 6,782,422 | B1 | 8/2004 | Bahl et al. |
| 6,784,837 | B2 | 8/2004 | Revankar et al. |
| 6,830,221 | B1 | 12/2004 | Janson et al. |
| 6,895,185 | B1 | 5/2005 | Chung et al. |
| 6,912,339 | B2 | 6/2005 | Whittaker |
| 7,133,416 | B1 | 11/2006 | Chamdani et al. |
| 2002/0018260 | A1 | 2/2002 | Kisovec et al. |
| 2002/0032780 | A1 | 3/2002 | Moore et al. |
| 2002/0044565 | A1 | 4/2002 | Park |
| 2002/0063169 | A1 | 5/2002 | Aki et al. |
| 2002/0065962 | A1 | 5/2002 | Bakke et al. |
| 2002/0101836 | A1 | 8/2002 | Xiao et al. |
| 2002/0101874 | A1 | 8/2002 | Whitaker et al. |
| 2003/0025967 | A1 | 2/2003 | Tai |
| 2003/0176198 | A1 | 9/2003 | Hafl et al. |
| 2003/0204789 | A1 | 10/2003 | Peebles et al. |
| 2003/0206134 | A1 | 11/2003 | Lier et al. |
| 2004/0043795 | A1 | 3/2004 | Zancewicz |
| 2004/0076429 | A1 | 4/2004 | Meroth et al. |
| 2004/0076434 | A1 | 4/2004 | Whittaker et al. |
| 2005/0213973 | A1 | 9/2005 | Rohrer |

FOREIGN PATENT DOCUMENTS

| | | | |
|---|---|---|---|
| DE | 3807072 | A | 8/1988 |
| DE | 3938856 | A1 | 11/1989 |
| DE | 4331330 | A | 9/1993 |
| DE | 42 26 838 | A1 | 2/1994 |
| DE | 4427187 | A1 | 2/1996 |
| EP | 0 069 356 | A2 | 1/1983 |
| EP | 0 105 753 | A2 | 4/1984 |
| EP | 0 164 652 | A2 | 12/1985 |
| EP | 0 231 635 | A2 | 8/1987 |
| EP | 0 356 090 | A2 | 2/1990 |
| EP | 0 380 341 | A2 | 8/1990 |
| EP | 0393293 | | 10/1990 |
| EP | 0 414 333 | A3 | 2/1991 |
| EP | 0 414 333 | A2 | 2/1991 |
| EP | 0 905 936 | A2 | 3/1991 |
| EP | 0451426 | | 10/1991 |
| EP | 0503212 | | 9/1992 |
| EP | 000103873 | A2 | 3/1994 |
| EP | 0 739 103 | A2 | 10/1996 |
| EP | 0 744 797 | A1 | 11/1996 |
| EP | 0 899 161 | A1 | 3/1999 |
| EP | 0 350 720 | A3 | 1/2001 |
| EP | 0 350 720 | A2 | 1/2001 |
| EP | 1 246 378 | A2 | 10/2002 |
| FR | 86-191340/30 | | 6/1986 |
| GB | 2 073 877 | A | 10/1981 |
| GB | 2087679 | | 5/1982 |
| GB | 2102232 | | 1/1983 |
| GB | 2189961 | | 11/1987 |
| GB | 2 255 683 | A | 11/1992 |
| JP | 7-202921 | | 8/1994 |
| JP | 9-51322 | | 2/1997 |
| JP | 9-321739 | | 12/1997 |
| JP | 10-107773 | | 4/1998 |
| JP | 11-87823 | | 3/1999 |
| JP | 11-331224 | | 3/1999 |
| WO | WO 93/03406 | | 2/1993 |
| WO | WO 00/57582 | | 9/2000 |

OTHER PUBLICATIONS

"Performance Management—Management of Sonet Networks—White Paper," Clear Communications, *Sonet and Performance Management,* Issue 1, Apr. 1996 (pp. 1–21).

Gallardo, et al., "Fast Simulation of Broadband Telecommunications Networks Carrying Long–Range Dependent Bursty Traffic," Preceedings of the 1999 Winter Simulation Conference, pp. 374–381 (Winter 1999).

Iannone, et al., "A 160–km transparent metro WDM ring network featuring cascaded erbium–doped waveguide amplifiers," published by Optical Society of America (2000).

Kempainen, "Optical Networking lightens carrier–backbone burden," *EDN,* pp. 63, 64, 65, 66, 68, 70, 72 (Oct. 8, 1998).

Keyserling, A. and R.C.L., "Chapter 2: Number, Dimensions, Manderlbrot, Chaos, 4 Attractors, Music and Color," www.chanceandchoice.com/ChanceandChoice/chapter2.html.

Press Release entitled "Lucent Technologies announces record–breaking 320–channel optical networking system," (pp. 1–2) (Apr. 17, 2000).

Technical Report CSRI–298 entitled "A New Binary Logarithmic Arbitration Method for Ethernet," by Mart L. Moelle of Computer Systems Research Institute, Apr. 1994 (pp. 1–57).

Willinger, et al., "Self–Similarity Through High–Variability: Statistical Analysis of Ethernet LAN Traffic at the Source Level," pp. 1–31 (Apr. 15, 1997).

WRL Research Report 88/4 entitled "Measured Capacity of an Ethernet: Myths and Reality" by David R. Boggs, et al., printed by Digital Western Research Laboratory, Palo Alto, California (Sep. 1998) (pp. 1–31), originally published in *Proceedings of the SIGCOMM '88 Symposium on Communications Architectures and Protocols,* ACM SIGCOMM, Stanford, California, Aug. 1988.

Yamashita, et al., "Studies of a system gathering multi–channel visual signals using a single optical fiber and a single optical fiber and a bi–directional optical amplifier," *T>IEE Japan,* 119–C(12):1528–1534 (1999).

Stewart D. Personick, *Optical Fiber Transmission Systems* 1–3 (1981).

H. Hodara and E. Miles, *High–Speed Local Area Networks,* Fiber and Integrated Optics 253–277 (1992).

N.A. Olsson, *Lightwave Systems With Optical Amplifiers,* Journal of Lightwave Technology 1071–1082 (Jul. 1989).

ITU–T Recommendation G.681, Series G: Transmission Systems and Media, Digital Systems and Networks; Functional characteristics of interoffice and long–haul systems using optical amplifiers, including optical multiplexing (Oct. 1996).

ITU–T Recommendation G.692, Series G: Transmission Systems and Media, Digital Systems and Networks; Optical interfaces for multichannel systems with optical amplifiers (Oct. 1998).

Gordon Thomas, David A. Ackeman, Paul R. Prucnal, and S. Lance Cooper, *Physics In The Whirlwind of Optical Communications,* Physics Today 30–36 (Sep. 2000).

Chart and figures for optical fiber cable and baseband transmission, available at http://www.microsoft.com/technet/WFW/wfw31/1_ch1.asp.

HDR 7.0 2 73; 7.0 Fiber Optic Ethernet—Types FOIRL and 10 BASE–F available at http://www.uni–trier.de/infos/ether/ethernet–guide/ethernet–guide.html.

3.0 IEEE Acronyms available at http://spacey.net/ldavis/Design_Ethernet_Note.html.

Fibre Channel—Overview of the Technology, Sep. 9, 2000, pp. 1–9 available at http://fibrechannel.org/technology.

Bi–Directional Optical Backplane Bus for Board to Board Optoelectronic Interconnects, Gicheri Kim, Jinghuai Fa and Ray T. Chen, 1–4 (Sep. 9, 2000) available at http://ece.utexas.edu/projects/ece/mrc/profs/chen_projects/optbus/optbus.html.

SOME Bus (Simultaneous Optical Multiprocessor Exchange Bus)(Sep. 9, 2000) available at http://eb.uah.edu/–cohen/some_bus/some_bus.html.

Integrated Explorations of the Spectral, Temporal and Spatial Degrees of Freedom 1 (Sep. 9, 2000) available at http://thebusinessedge.com/reruns/cito/sargent/sld001.htm.

Challenges in IP LANs on Higher–Dimensional Encoding (slide 4) (Sep. 9, 2000) available at http://thebusinessedge.com/reruns/cito/sargent/sld004.htm.

0034–P PCI Fibre Channel Optical Host BUS Adapter 1–4 available at http://solutions.sun.com/dbsearch/index.cgi?STATE=product&CMD=show&p_id=58181 (Sep. 9, 2000).

Architectural and Engineering Issues for Building an Optical Internet 1–55 (Sep. 9, 2000) available at http://www.canet3.net/papers/ArchandEngIssues.html.

Baker, *Monomode Fiber–Optic Design with Local–Area and Long–Haul Network Applications* 370–371.

Karim, *Chapter 9: Electro–Optical Devices and Systems,* Fiber–Optics–Based Devices and Systems 434–435.

Chinton Lin, *Systems Applications of WDM Technologies in Optical Communications,* SPIE–International Society for Optical Engineering (Aug. 15–18, 1994).

Manuel Lopez–Amo, Loudon T Blair & Paul Urquhart, *Wavelength–Division–Multiplexed distributed optical fiber amplifier bus network for data and sensors,* Optics Letter 1159–61 (Jul. 15, 1993).

Francesco Matera & Marina Settembre, *Performance Evaluation of Optically Amplified Systems Operating in Optical Networks,* Microwave & Optical Technology Letters (Nov. 1996).

Spirit et al., *140–km 20–Gbit/s repeaterless transmission employing distributed erbium amplification,* Optical Fiber Communication Conference (1992).

Decotignie, J.D., et al., "Producer–Distributor–Consumer Model on Controller Area Network," Proceedings of the IFAC/IFIC Workshop, Real Time Programming, 1995, pp. 35–42, XP002074139, Oxford, Great Britain.

International Search Report for PCT/US01/46225.

Liew, "A Broad–Band Optical Network Based on Hierarchical Multiplexing of Wavelengths and RF Subcarariers," *Journal of Lightwave Technology,* 7(11):1825–1838 (1989).

Al–Raweshidy and Komaki (Editors), "Basic Microwave Properties of Optical Links," *Radio Over Fiber Technologies for Mobile Communication Networks,* pp. 7–16 (Published by Artech House, Norwood, Massachusetts) (2002).

Fibre Channel Overview http://his.web.cem.ch/HIS/fcs/spec/overview.htm, pp. 1–10 (Nov. 5, 2002).

Ethernet FAST Ethernet Fiber Optic Media Converts, http://www.version.com/Ethernet.html, 2 pages (Nov. 5, 2002).

HomeNetHelp.com, http://www.homenethelp.com/web/explain.about–hubs–and–switches.asp, 5 pages (Nov. 5, 2002).

Fibre Channel, http://www.iol.unh.edu/training/fc/fc_tutorial.html, 22 pages (Nov. 5, 2002).

International Search Report in related Application No. PCT/US03/30326.

International Search Report in related Application No. PCT/US03/29970.

International Search Report in related Application No. PCT/US03/03310.

International Search Report in related Application No. PCT/US03/03329.

International Search Report in related Application No. PCT/US03/10053.

Koopman and Upender, "Time Division Multiple Access Without a Bus Master," United Technologies Research Center Report RR–9500470 (Jun. 1995).

* cited by examiner

OPTICAL TRANSPORT SYSTEM

Matter enclosed in heavy brackets [ ] appears in the original patent but forms no part of this reissue specification; matter printed in italics indicates the additions made by reissue.

*This application is a continuation-in-part of U.S. patent application Ser. No. 08/831,375 filed Apr. 1, 1997, now U.S. Pat. No. 5,901,260.*

BACKGROUND OF THE INVENTION

1. Field of the Invention

The present invention generally relates to an optical transport system for transmitting, extracting, and inserting light bi-directionally on a light transmission line, and more particularly to a redundant, non-blocking, bidirectional, multi-channel, protocol independent optical transport system for the simultaneous transfer of multiple, optically encoded signals.

2. Background Discussion

A variety of different topologies are employed to manage the transmission of data on an electrical data bus. Known network topologies include: 1) broadcast, such as utilized on a data bus; 2) point-to-point electrical and optical repeater lines, such as seen with the ring configuration; 3) and logical star, where all data is transmitted to and from a central location for retransmission to an intended recipient.

One particular problem with these known network topologies is that they cannot be easily integrated with one another. In essence, once a particular topology and protocol are chosen for managing the transmission and receipt of data on a given network, that topology and protocol must always be used by the network. This lack of adaptability is a particular detrimental problem when new or more useful topologies are developed but cannot be applied to existing data transmission networks which are locked into archaic, less efficient topologies.

Recent advances in data transmission technology have been directed to increasing the bandwidth or data capacity of the network, i.e., increasing the amount of data that can be transmitted by the network.

Physics imposes data rates limits on standard optical networks which encode data in pulses of laser light and dispatch them through wires made of glass. Very fast data rates require very short pulses, which tend to smear into one another as they travel through kilometers of fiber. Electronic devices staggered along the path can clean up the signal, but they are expensive and can work on at most 50 billion bits per second using current technology.

To increase the data capacity, researchers have transmitted many signals simultaneously over a single fiber by encoding them in different wavelengths or channels. Transmission networks that use this technique, known as wavelength division multiplexing (WDM), have boosted the capacity of existing fiber twenty fold or more.

SUMMARY OF THE INVENTION

Accordingly, it is an object of the present invention to provide an optical transport system which overcomes the disadvantages of the prior art and takes advantage of the recent advances in wavelength division multiplexing.

Accordingly, it is another object of the present invention to provide a novel, bi-directional, redundant optical transport system configured to provide a non-blocking, bidirectional, multi-channel, protocol independent optical transport system for the simultaneous transmission of multiple optical signals.

It is a further object of the present invention to provide an optical transport system using an unique optical amplification arrangement whereby through-fiber between nodes of the system are doped with a rare earth, such as, for example, erbium to provide sufficient amplification to compensate for coupler splitting losses, splice and connector losses.

One particularly advantageous feature of the present invention is that it provides an advanced bus structure which readily supports the bandwidth and channel capacity requirements of present and further avionics data buses while providing physical redundancy to enhance network survivability.

Another particular advantageous feature of the present invention is that it provides the ability to simultaneously transmit a plurality of information as analog, digital and discrete signals over a single wavelength using a single fiber. In this regard, the invention is capable of the simultaneous, non-interfering transmission over multiple topologies of multiple co-existing protocols each running at independent data rates. Additionally, it features the simultaneous, non-interfering transmission over multiple co-existing topologies of analog, digital and discrete signals.

The present invention relates to an optical transport system that permits one, two or a plurality of different network topologies to be respectively connected by one, two or a plurality of fiber optic transmission lines that each transmit light bi-directionally over each of the one, two or plurality of fiber optic lines. Each fiber optic transmission line is capable of carrying one, two or a plurality of wavelengths and each wavelength can contain one, two or a plurality of analog, digital and discrete signals that are encoded using one, two or a plurality of encoding techniques.

The heart of the present invention is an ingenuous arrangement of passive fiber optic couplers, which when combined with wavelength division multiplexing (WDM) selectively route optical signals in and out of the system at each node thereof as discloses by Applicants co-pending U.S. patent application entitled An Optical Interface Device, Ser. No. 08/831,375, filed Apr. 1, 1997, (the entire disclosure of which is herein incorporated by reference for all purposes). This optical interface device, also sometime referred to as an optical bus interface module (OBIM), is capable of inserting, extracting and transmitting light bi-directionally over one, two or a plurality of fiber optic transmission lines carrying one, two or a plurality of wavelengths over each fiber optic transmission line and each wavelength contains one, two or a plurality of analog, digital or discrete signals that are encoded using one, two or a plurality of encoding techniques.

These and other objects, advantages and features of the present invention are achieved, according to one embodiment of the present invention by a redundant, optical transport system which is configured to provide a non-blocking, bi-directional, multi-channel, protocol independent optical transport system for the simultaneous transfer of multiple optical signals between a plurality data terminal equipment. The optical transport system includes a light transmission line for transmitting light bi-directionally and a plurality of nodes, connected linearly by the light transmission line for receiving, extracting and passing signal light. Each node comprises: data terminal equipment for issuing and receiving electrical signals; an electro-optical interface device, associated the data terminal equipment, for converting electrical signals issued by the associated data terminal to light signals for insertion onto the light transmission light and for converting signal light, extracted from the light transmission line into electrical signals to be received by the associated data terminal; a translation logic device connected between the optical interface device and the data terminal equipment, if required, for performing required protocol translation for the data terminal equipment and an optical interface device, connected to the electro-optical interface device and the light transmission line, for extracting light signals from the light transmission line to be converted into electrical signal by the electro-optical interface device for receipt by the data terminal equipment, for inserting, onto the light transmission line, signal light received from the electro-optical interface device and for passing signal light bi-directionally on the light transmission line.

The transport system further includes a pumping arrangement, for example, an optical pump source, for inserting excitation light onto the light transmission line; an optical amplifier connector fiber connecting the each of the optical interface devices linearly to one another, wherein the optical amplifier connector fiber is doped with a material which is excited by the excitation light and which emits light having a same wavelength as the light signals when radiated with light signals transmitted bi-directionally by the at least one fiber optic line.

BRIEF DESCRIPTION OF THE DRAWINGS

FIG. 4I illustrates an arrangement where, by using dichroic couplers, the resulting topology for these nodes is that of a Point-to-Point Repeatered Link;

DETAILED DESCRIPTION OF THE PREFERRED EMBODIMENT(S)

The Optical Transport System—General Description

Figure 1A:
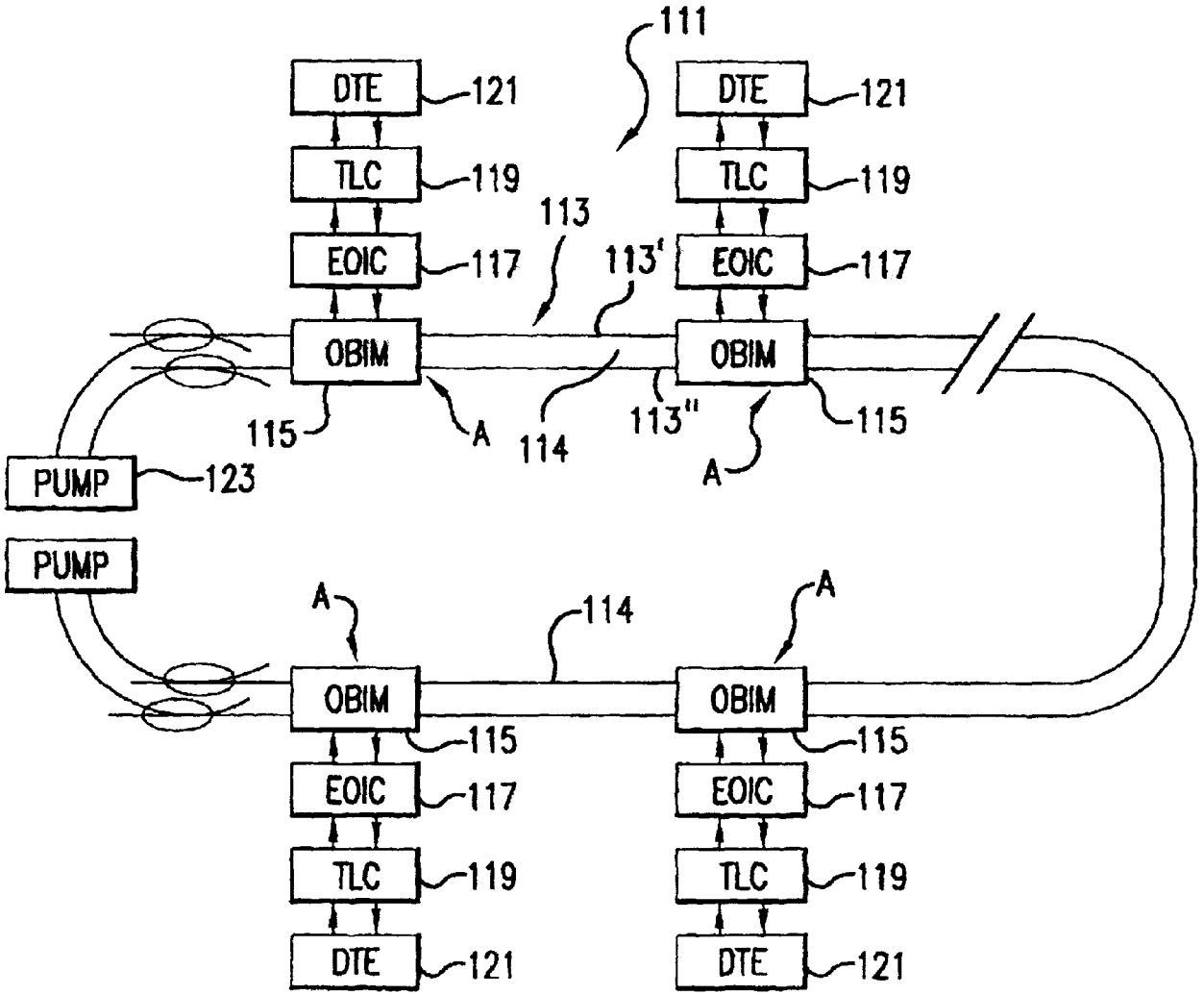
FIG. 1A is a block diagram which schematically illustrates the optical transport system of the present invention.

Referring to FIG. 1A, a block diagram of a first embodiment of an optical transport system in accordance with the present invention, generally indicated at 111, is illustrated for extracting, inserting and passing light bi-directionally on a light transmission line, generally indicated at 113, which comprises at least one fiber optical fiber. The system 111 is designed to permit communication between different electrical devices having differing communication protocols and requirements. The optical transport system 111 preferably forms a broken ring, as shown in FIG. 1A, to prevent the recirculation of light.

The system 111 comprises a plurality of optical bus interface modules (OBIM's) or optical interface devices 115, as discloses by Applicants co-pending U.S. patent application entitled An Optical Interface Device, Ser. No. 08/831,375, filed Apr. 1, 1997, (the entire disclosure of which is herein incorporated by reference for all purposes). Each OBIM 115 is an arrangement of passive fiber optic couplers, as will be more fully explained with particular reference to FIG. 4A, which wavelength selectively route optical signals in and out of the network at each node, generally indicated at A.

Figure 4A:
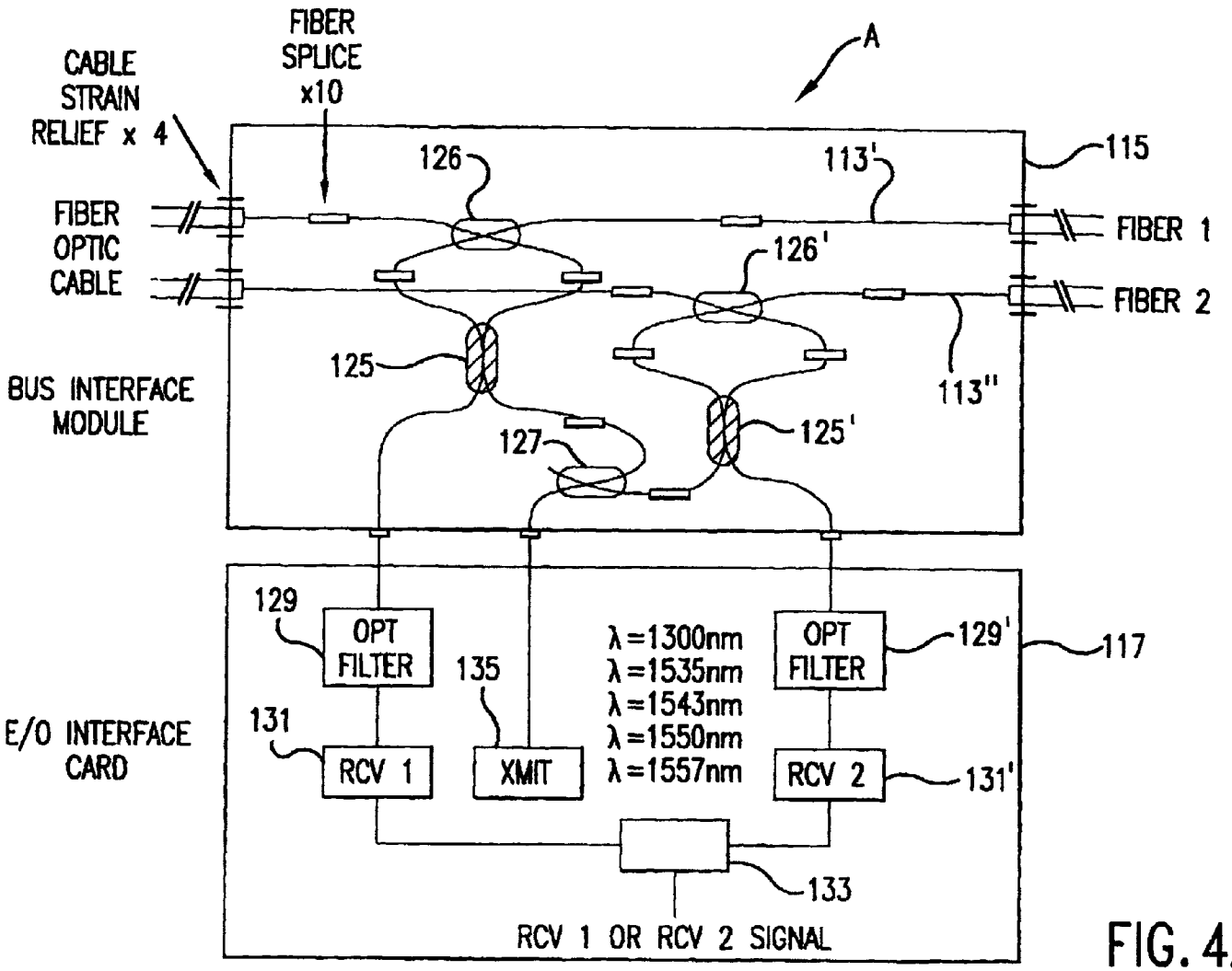
FIG. 4A illustrates the configuration of an E/O Interface card in use with yet another embodiment of the optical transport system of the present invention wherein the optical signal is inserted, extracted and passed on two separated but redundant fiber optic lines.

The primary purpose of the OBIM's 115 is to facilitate bi-directional data transmission and reception over fiber light transmission line 113 comprising one, two or a plurality of fiber optic lines as will be more fully described hereinafter. The configuration achieving this function is shown in FIG. 4A. The OBIM's 115 are interconnected, linearly, by the transmission line 113 and constitute a totally optical interface to the system 111.

The optical signals that are fed in or out of the systems 111 are then processed within the node A through the use of an electro-optical interface card (EOIC) 117 which includes wavelength selective filters, photoreceivers and a laser transmitter or light emitting diode photo-transmitter as will be more fully described hereinafter.

Each EOIC 117 is a device which performs an impedance match between the light and electrical domains. The input and the output of each of the EOIC's 117 are connected to a translation logic card (TLC) 119 which performs the required protocol translation for the data terminal equipment (DTE) 121, which comprises, for example, a computer, video or telephone device, which each have, for example, different protocol requirements. However, a TLC 119 is not required and the EOIC 117 can interface directly with the memory of each of the DTE 121. This eliminates approximately two thirds of the interface electronics presently employed for the purpose of transmitting information from one DTE to other DTE's.

Each EOIC 117 is provided for converting the optical signals transported over the transmission line 113 to electrical signals which will be eventually read by the associated DTE 121 and for converting the electrical signals issued by the associated DTE 121 to optical signals for transmission over the optical transmission line 113.

The EOIC 117, in addition to performing the electrical-to-optical and optical-to-electrical function, provides the means for signal transfer between bus elements and the work stations through TLC's 119 (intermediate interface cards). A TLC is a device which performs protocol impedance matching between the DTE's and the EOIC's. The protocol can be either the preferred direct digital memory interface, the direct analog sensor interface or a legacy protocol. The TLC 119 is capable of receiving or transmitting and converting one or more protocols. For example, two such cards provide standardized avoioncis communication protocols for ARINC 429 and Mil_Std 1553. Two PC based workstations (DTE's 121) provide data display capability using a multi-window display format for the simultaneous viewing of multiple signals and man-machine interface.

Figure 2:
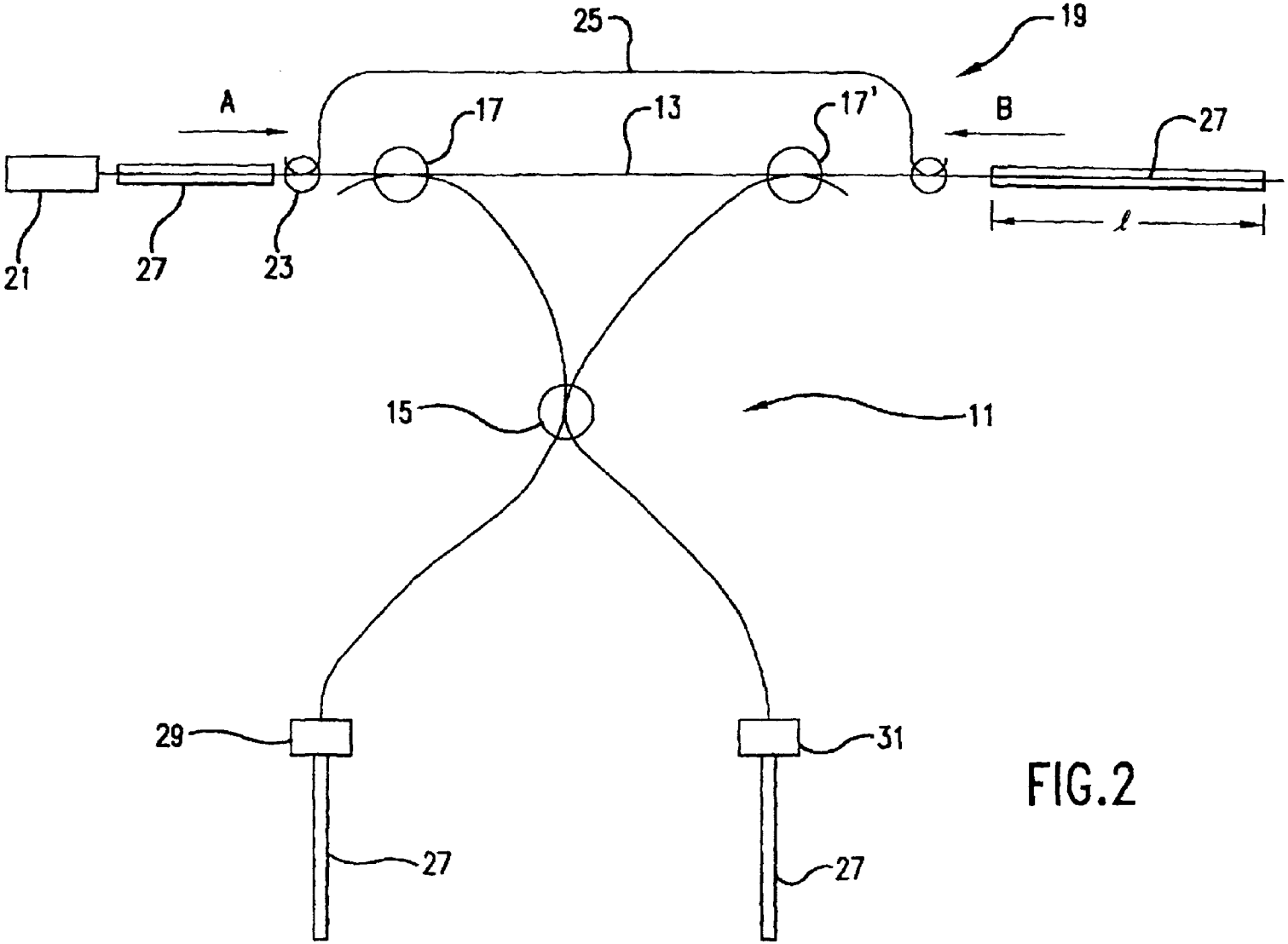
FIGS. 2 and 3 illustrate arrangements for providing optical amplification within the optical transport system of the present invention.

The optical transport system 111 incorporates optical amplification which is powered using a laser pump 123, emitting light having a wavelength of about 980 nm as will be more fully described with particular reference to FIG. 2.

The transmission line 113 of the general configuration of the optical transport system 111 illustrated by FIG. 1A, comprises two optical fibers 113', 113" (one serving as a redundant fiber) laid out in a "broken ring" to avoid recirculation of the optical signals. The through fibers at 114 (as best seen in FIG. 4f) between each node A are a few meters long and doped with a rare earth, such as, for example, erbium to provide amplification to compensate for all optical losses encountered by an optical signal passing through an OBIM 115 as will be explained hereinbelow. Optical amplification in the erbium doped through fibers is obtained by a "pump" signal provided by laser pump 123 transmitted through the entire system 111.

Figure 1B:
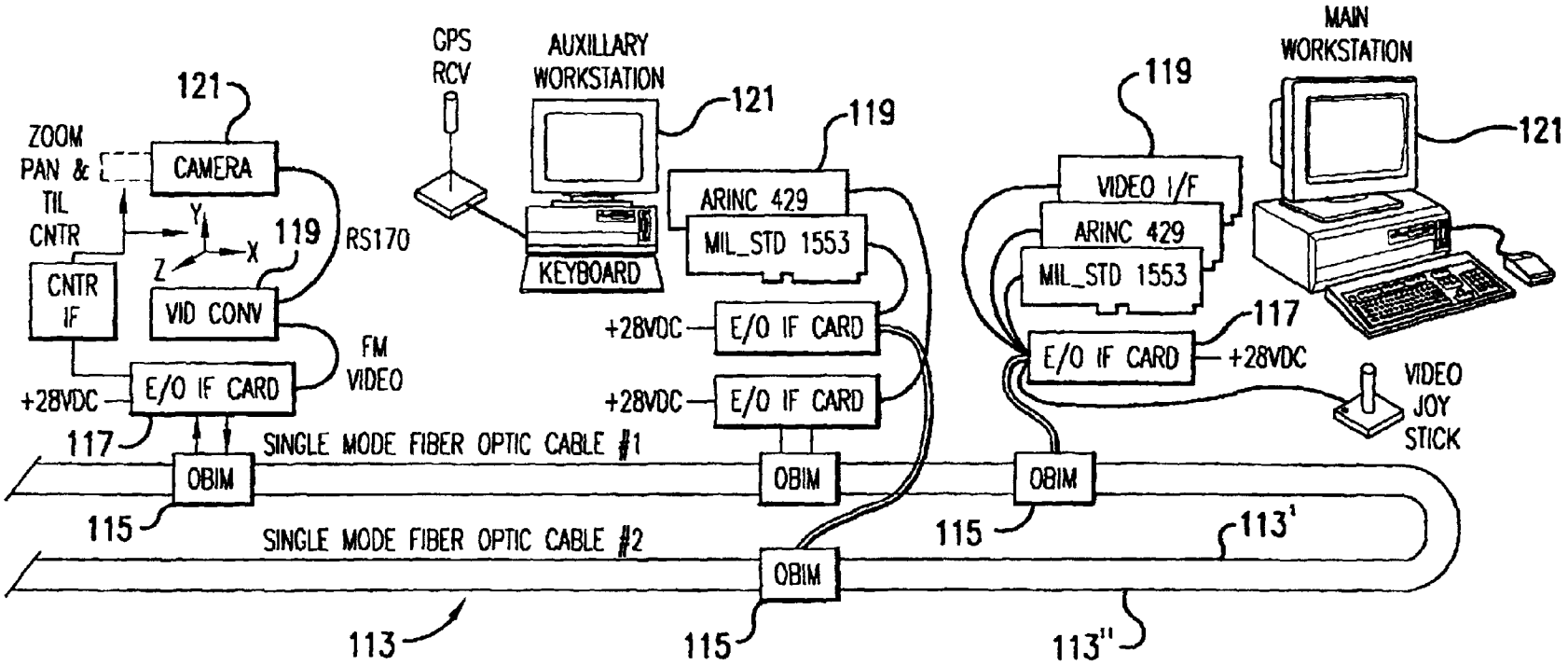
FIG. 1B is a pictorial representation of the elements comprising the optical transport system of FIG. 1A.

FIG. 1B is a pictoral representation of the optical transport system 111 of the present invention illustrated by FIG. 1A.

Arrangement For Pumping The Optical Transport System

Referring to FIG. 2, a first embodiment of the arrangement for optically pumping the system 111 is shown at 19. For the sake of simplicity, the OBIM at 11 is shown configured for use with a single fiber optic line 13.

The arrangement 19 comprises a pump source 21 for inserting excitation light (about 980 nm) onto the transmission line 113 which as noted above, comprises a single fiber optic line 113, however, the present invention is not limited to a single line 13 and envisions use with two or more fiber optic lines as will be more fully discussed hereinafter.

An optical amplifier 27 for amplifying signal light is also provided which comprises, for example, a connector fiber optic line having a length 1, for connecting the OBIM 11 with other devices as well as between OBIM's of the system 111. The connector fiber optic line of the optical amplifier 27 is doped with a material that is excited by the excitation light and that emits light having a same wavelength as the light signals when radiated with light signals.

Erbium is a suitable material for doping the fiber optic line of the optical amplifier 27 because 980 nm excitation light excites erbium atoms in the fiber such that when the excited erbium atoms collapse, 1550 nm light (the same wavelength as the signal light) is emitted. Therefore, when a photon of 1550 nm signal light collides with the excited erbium atoms, one photon of 1550 nm signal light becomes two photons of 1550 nm signal light.

According to the preferred embodiment of FIG. 2, the pump source 21 is a pump laser which emits excitation light having a wavelength of about 980 nm. As noted above, the signal light has a wavelength of about 1550 nm. The length 1 of the optical amplifier connector fiber is set as a function of the amount of amplification required and in the preferred embodiment of FIG. 2, the length of the connector fiber of the optical amplifier 27 is about two meters.

The connector fiber of the optical amplifier 27 is used to connect the OBIM 11 to an other device, including, but not limited to another OBIM 11 and can be provided both prior to and subsequent to the OBIM 11. Further, the connector fiber of the optical amplifier 27 can also be connected to at least one of the extraction port 29 or the insertion port 31 of the OBIM 11.

Figure 3:
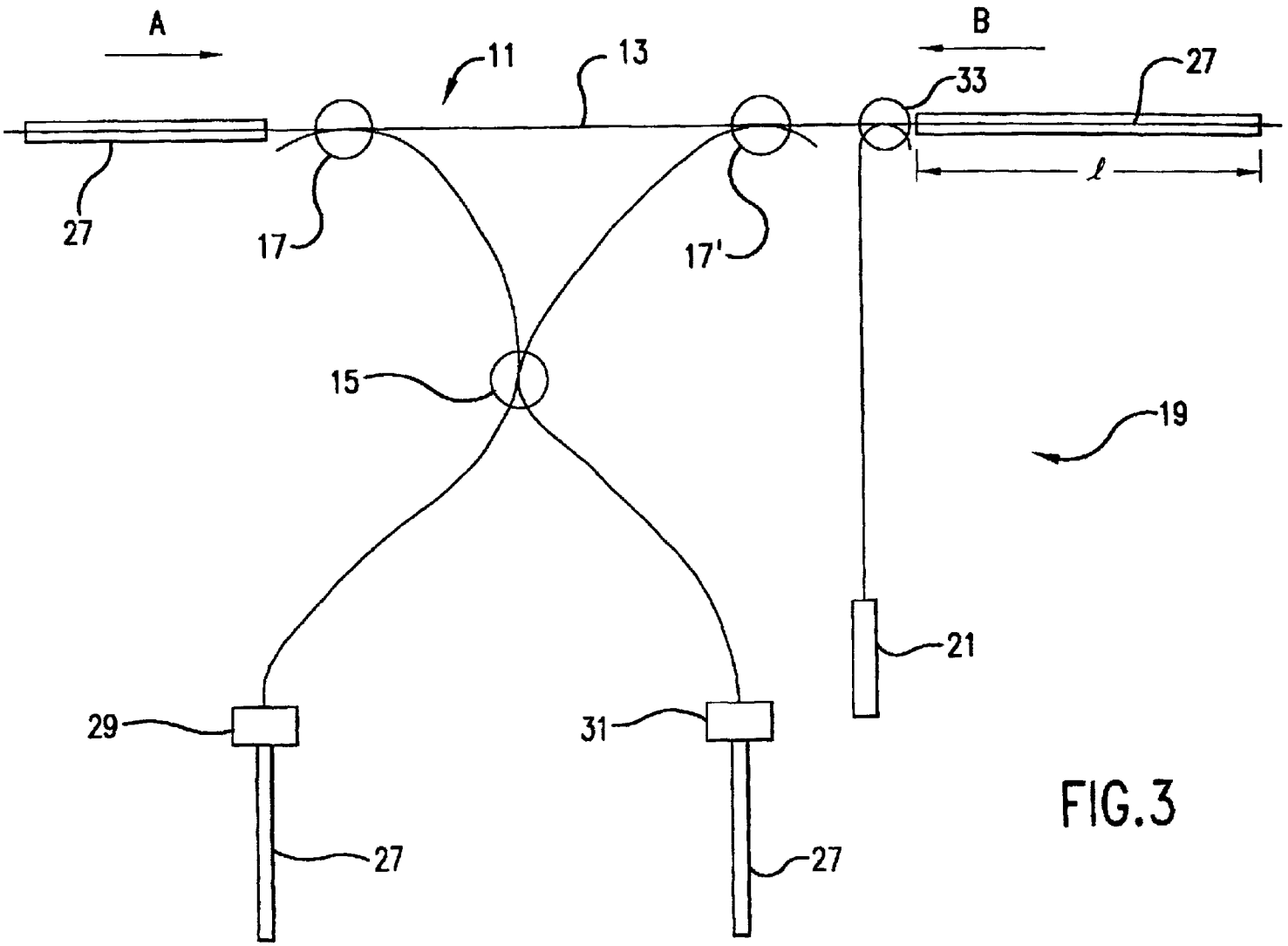

Referring to FIG. 3, a further embodiment of the arrangement 19 for optically pumping an OBIM 11 is illustrated wherein each OBIM 11 is provided with a pump source 21 for emitting excitation light. A coupler 33, such as, for example, a wave division multiplexer is provided for inserting the excitation light from the pump source 21 onto the at least one fiber optic line 13 to one side of the pair of fiber optic-line, optical couplers 17, 17' of the OBIM 11.

An optical amplifier 27 for amplifying signal light is also provided for receiving excitation light from the pump source 21 as well as signal light transmitted in both directions A or B on the at least one fiber optic line 13. As described above, the optical amplifier 27 comprises, for example, a connector fiber optic line having a length 1, for connecting the OBIM 11 with other devices. The connector fiber optic line of the optical amplifier 27 is doped with a material, such as, for example, erbium, that is excited by the excitation light and that emits light having a same wavelength as the light signals when radiated with light signals.

According to the preferred embodiment of FIG. 3, the pump source 21 is a pump laser which emits excitation light having a wavelength of about 980 nm. As noted above, the signal light has a wavelength of about 1550 nm. The length 1 of the optical amplifier connector fiber is set as a function of the amount of amplification required and in the preferred embodiment of FIG. 3, the length of the connector fiber of the optical amplifier 27 is about two meters.

The connector fiber of the optical amplifier 27 is used to connect the OBIM 11 to another device, including, but not limited to another OBIM 11 and can be provided both prior to and subsequent to the OBIM 11. Further, the connector fiber of the optical amplifier can also be connected to at least one of the extraction port 29 or the insertion port 31 of the OBIM.

In lieu of the OBIM 11 of FIG. 2, it is understood that other OBIM configurations, as disclosed by Applicants' co-pending application noted above, wherein the at least one fiber optic line 13 comprises two or more fiber optic lines, are envisioned for use with present invention.

In order to provide redundancy the light transmission line 113 of the optical transport system 111 of the present invention preferably comprises a pair of fiber optic lines as best seen in FIG. 4A. Therefore, if one of the fiber optic lines is broken, the remaining fiber optic line will transmit the signal light.

DETAILED DISCLOSURE OF THE STRUCTURE

Referring to FIG. 4A, a preferred arrangement of an OBIM 115 is illustrated for the insertion and removal of light from the transmission line 113, which in this case, comprises a pair of fiber optic lines 113', 113", to implement the desired fail-safe operation, (if one line fails, the other line is available to provide the signal light). The OBIM 115 of FIG. 4A comprises first and second 50/50 couplers 125, 125', one provided for each of the pair of fiber optic lines 113', 113". The 50/50 couplers 125, 125' are provided for receiving light from the EOIC 117 to be inserted onto one of the fiber optic lines 113', 113" or for providing signal light extracted from the lines 113', 113" to the EOIC 117.

The OBIM 115 also comprises a pair of 80/20 fiber optic-line, optical couplers 126, 126", each coupled directly to one of the fiber optic lines 113', 113" and to one of the pair of 50/50 optical couplers 125, 125", for respectively passing light on the associated fiber optic line 113' or 113", for receiving light for the associated 50/50 optical coupler 125 or 125' to be inserted onto the associated fiber optic line 113' or 113" and for transmitting said received light in opposite directions on the one associated fiber optic line 113' or 113", and for extracting light from opposite directions on the one associated fiber optic line 113' or 113" and transmitting said extracted light to the associated 50/50 optical coupler 125 or 125'. An additional 50/50 optical coupler 127 is included for receiving light outputted by the EOIC 117 and providing the received light to the pair of 50/50 optical couplers 125, 125' for insertion bi-directionally on both of the fiber optic lines 113' and 113".

To understand the optical routing achieved by OBIM 115, the following discussion is provided. A signal exiting from the upper left fiber (labeled fiber 113') traveling toward 80/20 coupler 126 is split such that 80% of the signal is passed on fiber 113' to the next node and the remaining 20% is directed toward the EOIC 117. The remaining 20% of light, by action of the associated 50/50 coupler 125 is split equally and routed towards optical filter/receiver combination 129, 131. In a similar fashion, tracing the signal from the EOIC 117, light is split equally by 50/50 coupler 127 and provided to both 50/50 couplers 125, 125' when it is split equally and routed to each bus fiber 113', 113" for insertion thereon in opposite directions simultaneously one each of the fibers 113', 113".

Because two parallel optical paths now exist, optical signals for each will be slightly delayed with respect to each other as a function of path length difference between respective transmitting and receiving nodes. For high frequency operation, these signals must be treated independently, for example, by employing two optical receivers, one dedicated to each path.

Generic EOIC Structure

Located between the OBIM and the DTE 121, the EOIC 117 enables communication between like DTE's 121 located at different nodes of the system 111. As shown in FIG. 4A, the EOIC 117 comprises a pair of optical filters 129, 129' for respective receiving light signals extracted from the pair of fiber optic lines 113', 113". These optical filter, 129, 129', which have, for example, a 4 nm passband, precede optical receivers 131, 131', respectively, and pass only the designated wavelength of the corresponding network element (DTE 121 not shown in FIG. 4A) and reject all others. Optical receivers 131, 131' convert the received optical signals into electrical signals. Switch 133 selects one of the electrical outputs from receivers 131, 131', which is then provide to the TLC 119 for processing in order to be compatible with associated DTE 121 as will be more fully explained hereinbelow. Electrical outputs from the DTE 121 are converted to optical signals by the EOIC 117 which are inserted onto the fiber optic lines 113', 113" using the optical amplifier 135.

In a fully operational mode of the system 111, the output of either receiver 131, 131' is valid and the choice as to which to use is arbitrary. However, in the event of a fiber break, the alternative receiver is automatically selected. Each receiver 131, 131' detects and measures the incident input signal and outputs a corresponding digital signal indicating whether or not a minimum input optical power threshold is exceeded. Control logic then monitors these signals and selects the appropriate receiver.

Instead of continuous data transmission, the system 111, particularly when applied to avionics data bus requires, deals with bursty transmission (high density, clusters or packets of data). Most optical receivers designed for digital transmission incorporate automatic gain control for extending optical input dynamic range. These AGC loops have settling times in excess of many bit periods thereby causing loss of leading bits in a data packet. For continuous data this is generally not a problem, but in discontinuous data transmission, the situation is unacceptable. To get around this problem, the receivers 131, 131' operating on the principle of edge detection, although a penalty is incurred in terms of loss of optical sensitivity.

The details of the optical and electro-optical system for implementing simultaneous multi-network operation using multiple optical carriers over a single fiber implementation are also shown in FIG. 4A. The technical approach exploits the two low attenuation windows of step index single mode optical fiber, 1310 nm and 1550 nm. By means of narrow bandwidth optical sources, temperature controlled distributed feedback lasers, and complementary narrow band optical filters, multiple interfering optical carriers are realized in the 1550 nm operating band.

Therefore, it is possible to provide four channels within the 1550 nm operating band which each have center wavelengths at, for example, 1536 nm, 1543 nm, 1550 nm, and 1557 nm, each channel being capable of carrying different signal light imparting distinct information. Optical carrier encoding techniques supported by this architecture include signal formats such as Pulse Code Modulation (PCM), intensity modulation (IM) coherent or incoherent, amplitude, phase and frequency modulation.

Specific EOIC Structure of Mil_Std 1553

In addition to optical filtering and E/O and O/E conversion, the EOIC 117 is adapted to provide the required data encoding functions to convert the ARINC 429 and Mil_Std 1553 three-level codes to two level codes. In the electrical domain, these signals are encoded as tri-level signals and then converted to bi-level signaling with subsequent bandwidth increase. Although optical intensity modulation (IM) supports multi-level encoding, the preponderance of commercial optical receivers are designed for bi-level operation.

The encoding and decoding function is performed by the EOIC 117 which includes an on-board gate array containing conversion circuitry for both data types. In the present embodiment of the system 111, four data types transit the optical transport system 111: three digital and one FM video.

Figure 4B:
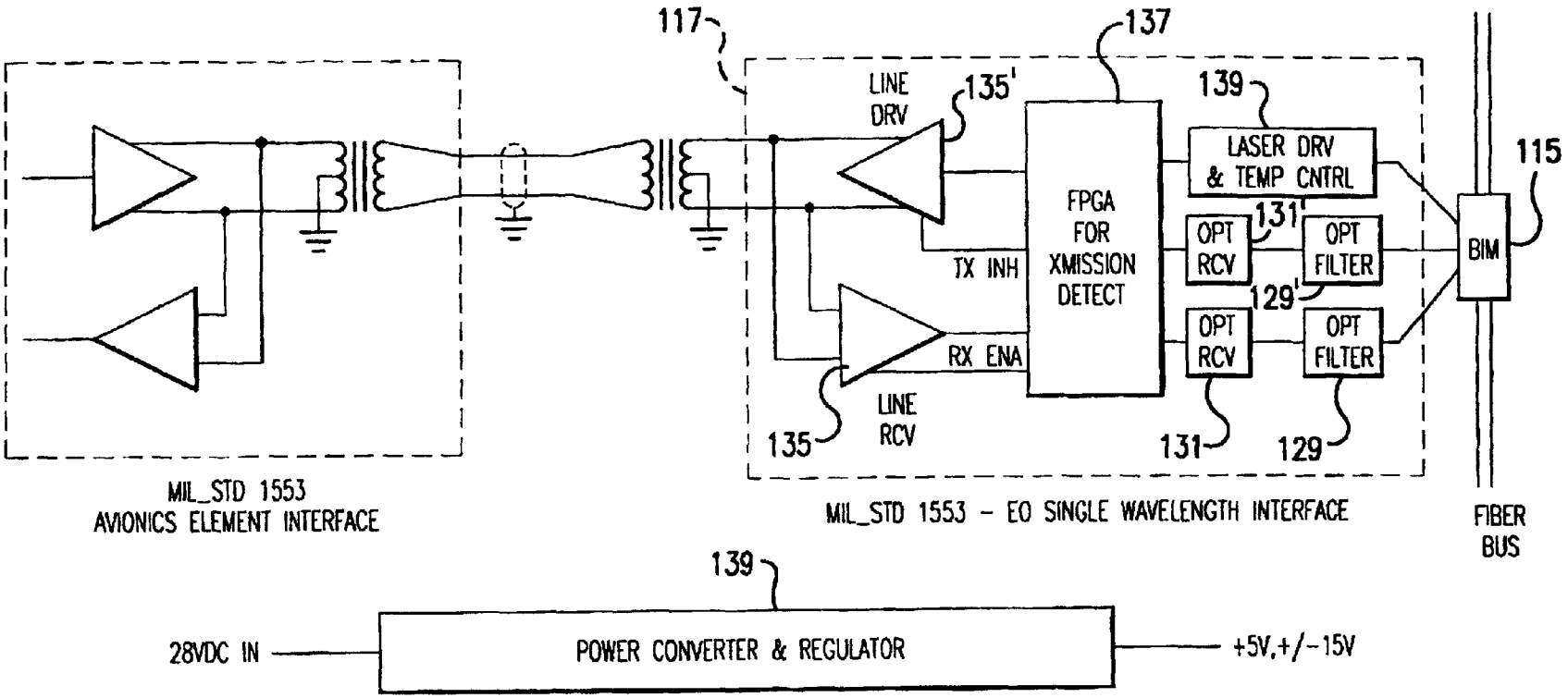
FIG. 4B, illustrates an EOIC configuration for Mil-Std 1553 avionics element.

As shown in FIG. 4B, an EOIC configuration for Mil_Std 1553 avionics element is shown. The EOIC 117 contains a number of hardware components for the transmission and reception of bus 113 signals, data encoding, traffic control and optical transmission and reception as discussed below.

Mil_Std 1553 line receiver 135 converts the bi-polar bus signal to digital logic level and line driver 135' converts logic level signals to bi-polar signals levels conforming to Mil_Std 1553 specifications.

Encoding optical transmission of the MIL-1553 bus messages requires converting the three state electrical signal to a two state optical signal which is accomplished by FPGA 137. MIL-1553 bus transmission medium is a twisted pair wire. Signal states present on the wire include a NULL state signifying inactivity, and two active states for the transmission of 1's and 0's. Thus, voltage across the two wire has three possible states. For optical transmission of the signal, it must be encoded in a waveform with only two states. Another requirement of the coding is that it must have zero DC content for any combination of sync patterns, ones and zeros. The encoding concept is to frequency encode the three states by assigning one frequency to denote the logical ONE, another frequency to denote a logical ZERO and a third frequency (0 Hz) to denote no transmission.

The laser drive and temperature control 139 performs two functions: 1) laser modulation and 2) laser temperature control. The laser driver converts the digital input signals from the FPGA 137 to current pulses used to modulate the laser. The resultant optical signal intensity waveform is representative of the digital input signal. The purpose of the laser temperature control is to maintain the laser at a constant temperature. DFB laser wavelength dependence is on the order of 0.1 nm/C. Tuning over a range of a few nanometers can be attained by varying the laser temperature. By controlling the laser temperature, the laser emission wavelength is adjusted to match the optical filter passband.

As noted in the general discussion of the EOIC structure, the optical receivers 131, 131' convert the received optical signal to an electrical signal. This receiver is a digital type and its output is PECL digital signal levels that are converted to CMOS levels using a comparator.

As shown in FIG. 4B, two optical receivers 131, 131' are employed, and as previously noted, due to invariable path length variation, some delay is experienced between the arrival of one signal with respect to the other. The delay precludes combining these signals either electrically or optically because of the resulting overlap that will eventually cause decoding errors. This situation is tolerable for low speed signaling where the relative delay is a small percentage of the bit period. However, at high data rates, i.e., those exceeding tens of hundreds of megahertz, nano-second delays become a significant percentage of the bit period. For this reason, the output of only one receiver 131, 131' is used.

Power module 139 generates, regulates and filters all secondary voltages derived from the prime avionics power of +28 VDC.

The protocol as defined by MIL_STD 1553 defines in part certain timing requirements for command and data transfer operations between nodes identified as either Bus Controllers (BC's) or Remote Terminals (RT's). Of particular importance in the design of the optical equivalent of the electrical bus is the preservation of intermessage gaps and the introduction of minimal transmission delay between the fiber optic elements and the electrical bus.

Specific EOIC Structure For ARINC 429

Figure 4C:
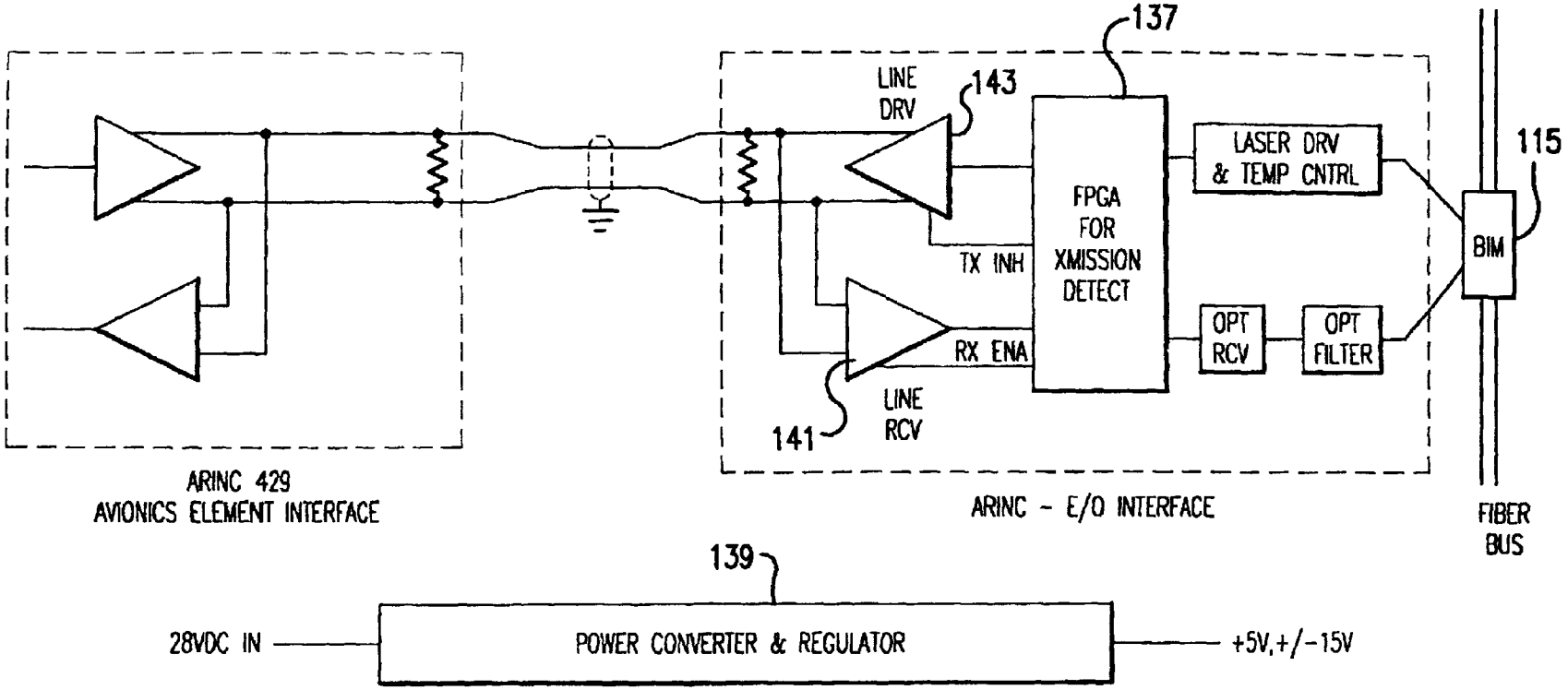
FIG. 4C illustrates an EOIC 117 for ARINC 429 avionic element.

Referring to FIG. 4C, an EOIC 117 for ARINC 429 avionic element is illustrated, wherein the functions and the components of the EOIC 117 are similar to the Mil_Std 1553 configuration discussed above with reference to FIG. 4B. Only those function and components that differ form the Mil_Std 1553 configuration will be discussed.

ARINC line receiver 141 converts the tri-state bus signal to CMOS compatible digital signals. The line driver 143 converts CMOS logic level signals to tri-state bus signal levels conforming to ARINC 429 specifications.

FPGA 137, provided for encoding optical transmission of the ARINC 429 bus message is conceptually identical to the Mil_Std 1553 encoding scheme. Frequency assignment to represent the bits and periods of no transmissions is similarly assigned.

Since ARINC 429 defines an air transport industry standard for the transfer of the digital data between avionics elements, it specifies the basic system configuration and communication protocols. Any avionics element having information to transmit, will do so form a designated output port over a single twisted and shielded wire pair to all other elements that have a need for such information. The information flow is uni-directional. The typical ARINC system consists of a controller, which oversees the gathering and time multiplexing of data in accordance with the protocol, a line driver capable of driving the twisted wire pair, and one or more receivers which process the received data transmitted over the twisted wire pair.

Figure 4D:
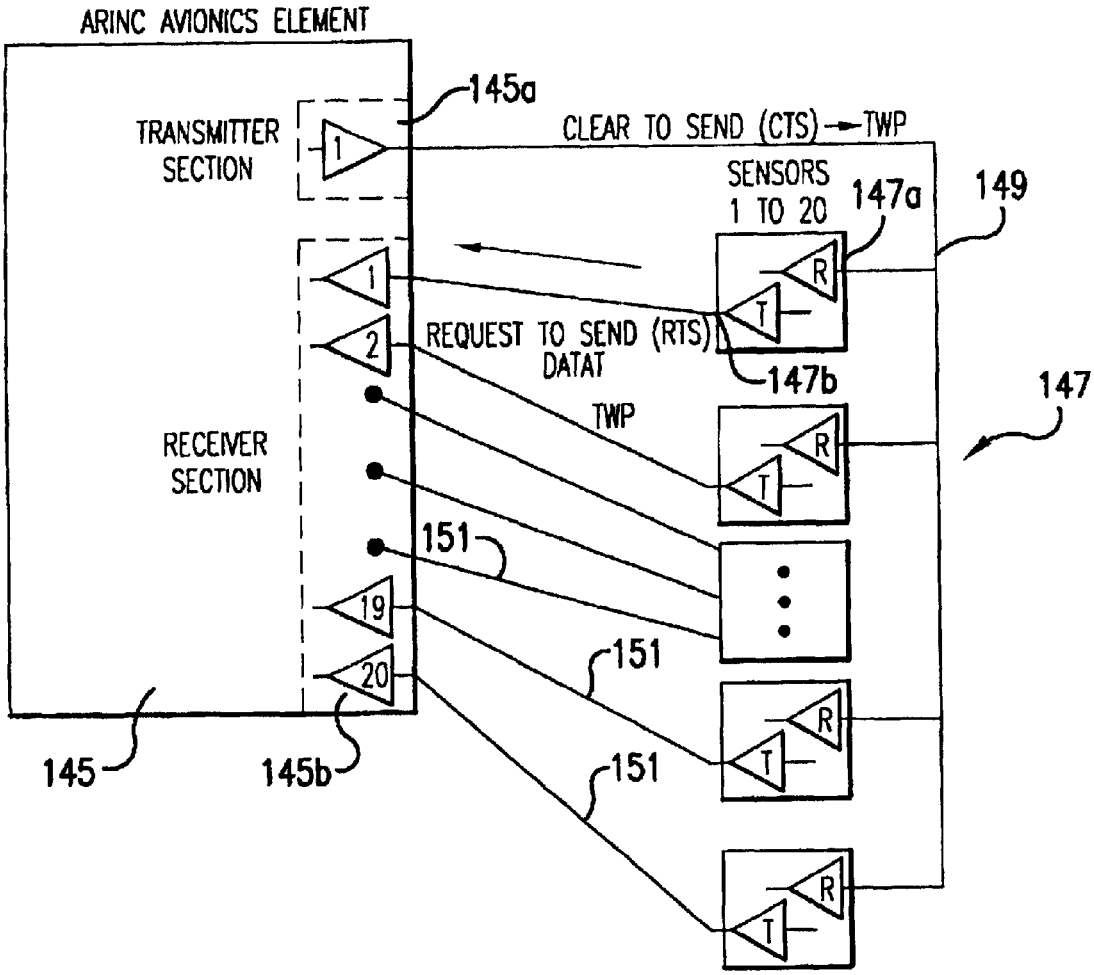
FIG. 4D illustrates a typical, known ARINC network configuration.

To determine the required functionality of a fiber optic implementation, the following discussion is provided with particular reference to a typical, known ARINC network configuration as shown in FIG. 4D. The ARINC network configuration comprises ARINC avionics element 145 having a transmitter section 145a and a receiver section 145b which are respectively connected to each of the inputs 147a and each of the outputs 147b of associated sensors at 147.

The operational features of the illustrated ARINC configuration include communications protocol between avionics element 145 and sensors 147 as well as the physical media required to support the protocol.

ARINC protocol defines that when one of the sensor 147 needs to send data, (called a Link Data Unit (LDU)), to the avionics element 145, the sensor 147 will issue a Request To Send (RTS) to the avionics element 145. The avionics element 145 responds with a Clear To Send (CTS) and data transfer commences. This method of data exchange exemplifies data transfer using an uni-directional bus 149 shared by multiple elements for data transfer initiation and dedicated buses 151 for data transfer from sensors 147 to the avionics element 145.

The protocol therefore relies upon two uni-directional busses to query and/or transmit dat to another element and receive data from such element. The timing associated with such transfers is sequential. A request is initiated, a response transmitted followed by data transmission.

Sometimes, upon system power-up or status check, an avionics element may request sensor confirmation that results in parallel transmissions from multiple sensors. This is a special instance, a condition to be recognized when designing the optical implementation. Having identified the basic ARINC communication protocol and system configuration, the optical solution that preserves bidirectional functionality and simultaneous transmissions over a single fiber transmission medium will now be discussed with particular reference to FIG. 4E.

Figure 4E:
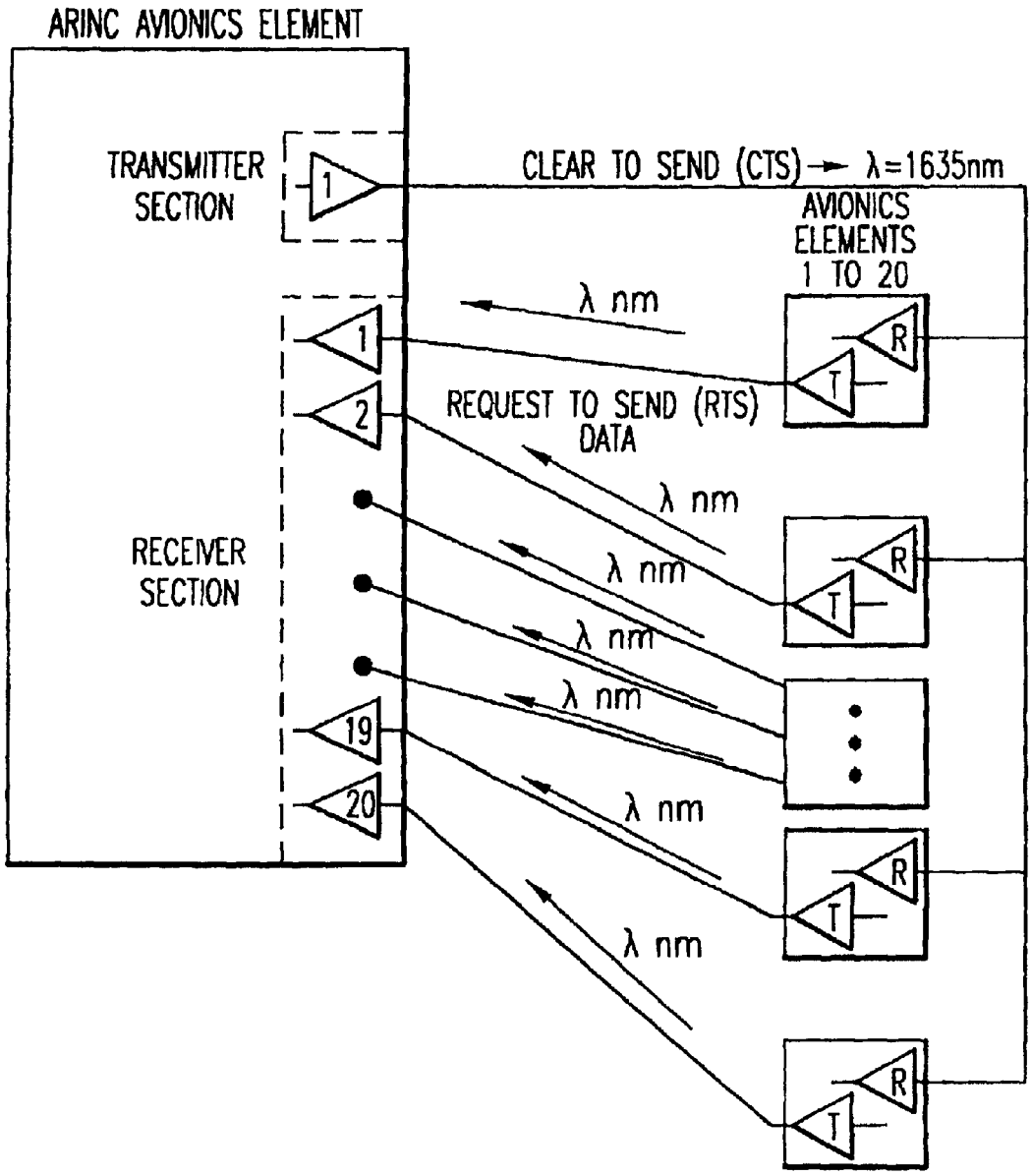
FIG. 4E illustrates an optical arrangement wherein different optical wavelengths are assigned for each equivalent electrical transmission path.
Figure 4F:
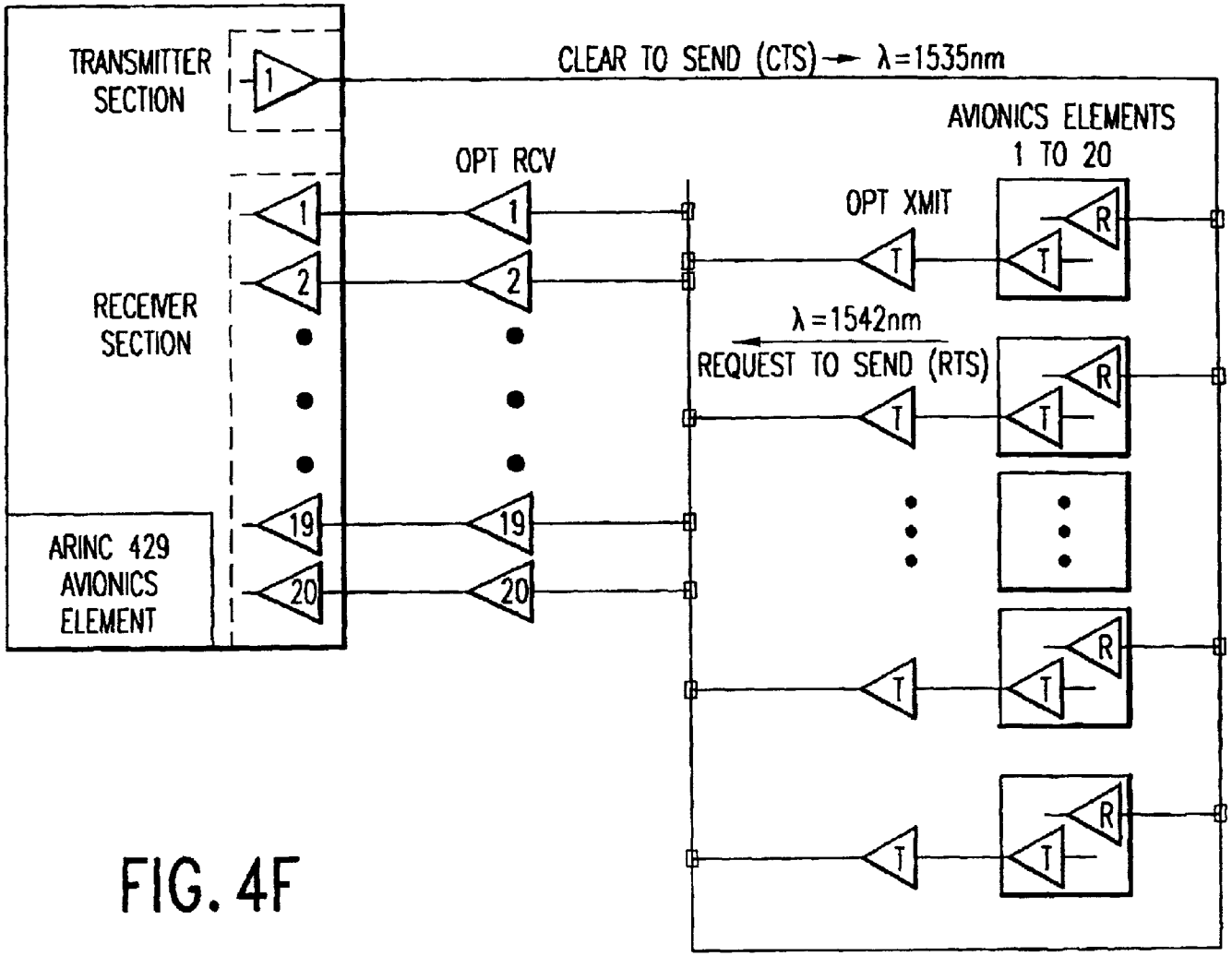
FIG. 4F, illustrates an optical arrangement which relies on Time Division Multiplexing (TDM) techniques to eliminate the plethora of optical wavelengths required by the arrangement of FIG. 4E.

Referring to FIG. 4E, an optical arrangement is illustrated wherein different optical wavelengths are assigned for each equivalent electrical transmission path i.e., all electrical buses are replaced with optical buses of different wavelengths. This approach is adequate if there are not a lot of sensors.

The second approach, as illustrated by FIG. 4F, relies on Time Division Multiplexing (TDM) techniques to eliminate the plethora of optical wavelengths required by the arrangement of FIG. 4E. For configurations requiring many sensors, elimination of the individual wavelength channels for each sensor is desired.

The key to eliminating the numerous optical wavelengths assigned to each remote terminal data return path is through time division multiplexing as shown in FIG. 4F. Normal operation prohibits multiple remote terminals (RT's) from simultaneous transmission, but as noted above, in certain circumstances such simultaneous transmissions can occur.

To fully satisfy these operating modes, a transmission protocol similar to Ethernet is adopted which specifies a procedure to resolve transmission conflict. Provision for temporary storage of data is required until access to the bus is obtained and transmission rates must be increased to equal the data rate of all RT's transmitting simultaneously.

Video EOIC Structure

Figure 4G:
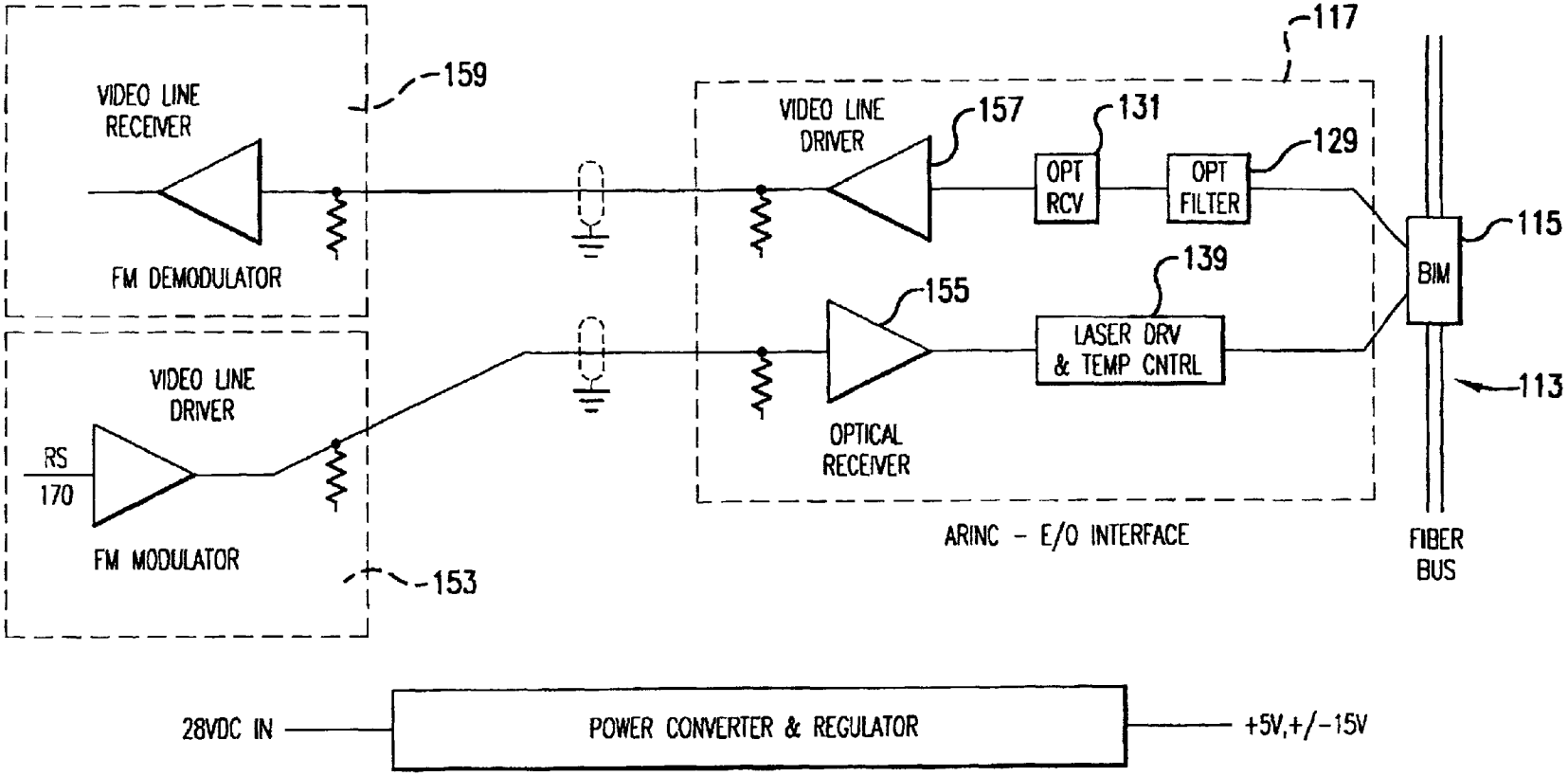
FIG. 4G illustrates the structure for an EOIC adapted to support video.

Referring to FIG. 4G, the structure for an EOIC 115 adapted to support video is illustrated. At the video source, a commercial video unit 153 up-converts the RS-170 baseband to an FM modulated signal which is received by optical receiver 155 so that the FM signal modulates EOIC card laser 139 for input to the OBIM 115 and insertion onto the transmission line 113.

A received optical signal is converted to an electrical signal by optical receiver 131 and the resulting signal provide to video line driver 157, the output of which drives the comparator demodulator 159. The recovered baseband signal serves as input of a frame grabber (not shown) located in the main workstation PC (not shown).

Operational Modes of the Optical Transport System

Figure 4H:
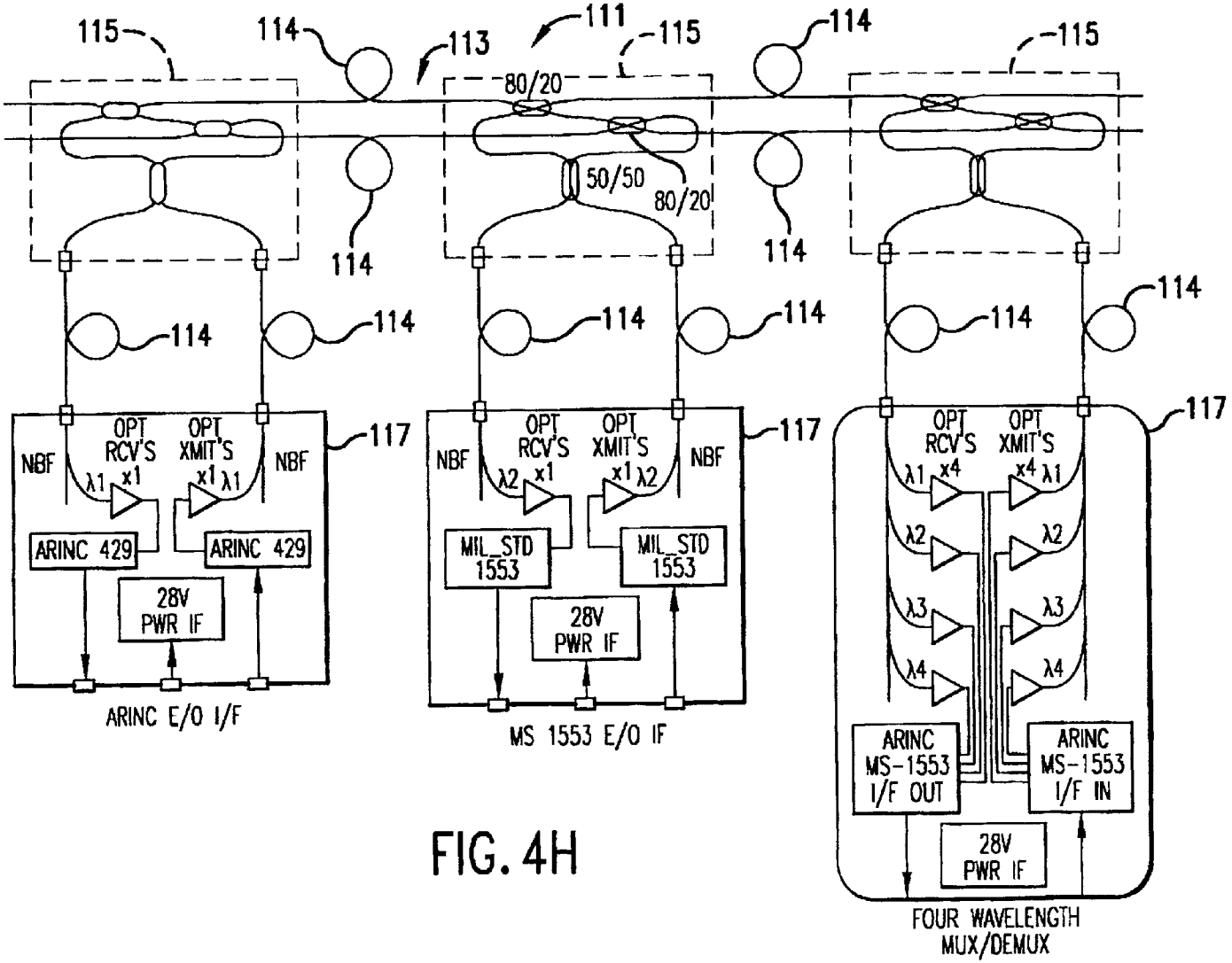
FIG. 4H illustrates an arrangement wherein different wavelengths are assigned to different nodes to provide a topology equivalent to a non-blocking Star configuration using MUX/DEMUXes.

It is clear from FIG. 1A, that when all the OBIM's 115 operate at the same wavelength, the system 111 functions as a Bus in the Broadcast Mode. Referring to FIG. 4H, if different wavelengths are assigned to different nodes, although some nodes can transmit and receive multiple wavelengths, the topology is equivalent to a non-blocking Star configuration using MUS/DEMUXes with as many as 128 wavelengths employing current technology wherein the maximum number of wavelengths is determined by the allowable cross-talk between channels, the laser line width, the optical amplifier pass band and the information bandwidth.

The present invention is not limited to fixed wavelengths. In fact, the present invention operates as a non-blocking logical switch if all nodes have their transmitters and receivers tunable. The operation is as follows: if a node want to transmit to a set of nodes on a specific wavelength and the transmitting node tunes its laser to that wavelength, the receiving nodes tune their receivers to the same wavelength. Tunable filters, whether electro-optical, acouto-optical or opto-mechanical can be inserted in the receivers in lieu of fixed filters in order to vary the wavelength assignment on a packet-to-packet basis as well as to provide dynamic routing.

If some OBIM's 115 are altered to be configured as in FIG. 4I by using dichroic (also known as WDM) couplers 116 and the corresponding nodes are assigned the same wavelength (in this example 1310 nm), the resulting topology for these nodes is that of a Point-to-Point Repeatered Link. This is equivalent to a ring topology, and although the ring is broken, all nodes communicate with each other because of the bi-directionality of the OBIM's 115. In this example, the repeater links use an ATM (asynchronous transfer node) protocol.

Optimum System Topology

Figure 5:
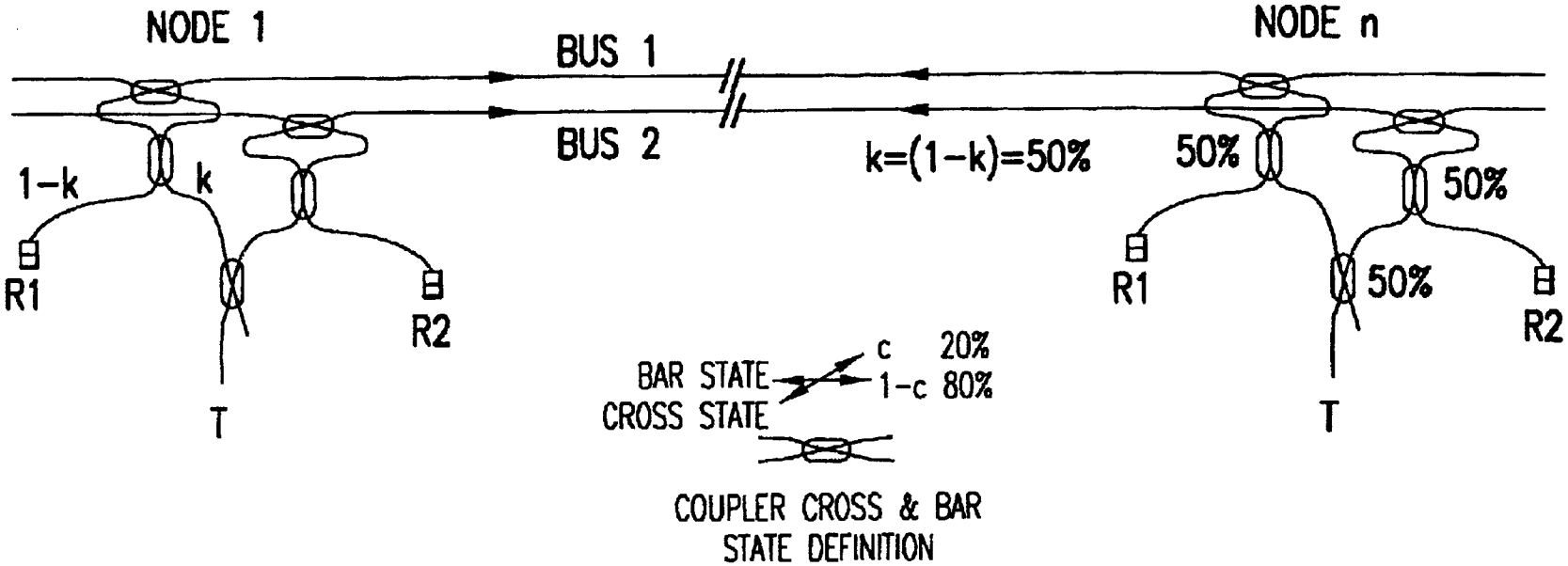
FIG. 5 illustrated an optimum bus interface topology with the specific coupler ratios 80/20 on-line and 50/50 off-line.

The optimum bus interface topology is illustrated in FIG. 5 with the specific coupler ratios 80/20 on-line and 50/50 off-line. As an example, the received signal at node n from node 1 is:

$$(0.5)(0.5)(0.2)[(0\ 2)(0.5)](0.8)^{n-2}=0.00125(0.8)^{n-2}=-23\text{ dB}$$

Optimum coupling is a function of the number of nodes. Calling the on-line coupling ratio c and the off-line coupling ratio k were c and k corresponding to the cross states and (1−c), (1−k) are the bar states, the bus is assigned arbitrary coupling c and k. Deriving the optimum coupling ratios by calculating the received signals at both extreme nodes as follows:

Received signal at node n from node 1: Bus 1 or Bus 2: $k^3(1-c)(1-c)(c)^{n-2}=k^3(1-c)^2(c)^{n-2}$ where n=number of nodes.

To ensure same signal strength at both nodes, k=1−k k=50%

Thus, the received signal at either node receiver contributed by either bus is: $S=0.125(c)^2(1-c)^{n-2}$. The optimum coupling as a function of nodes is obtained by setting ds/dc=0 which yields c=2/n.

Figure 6:
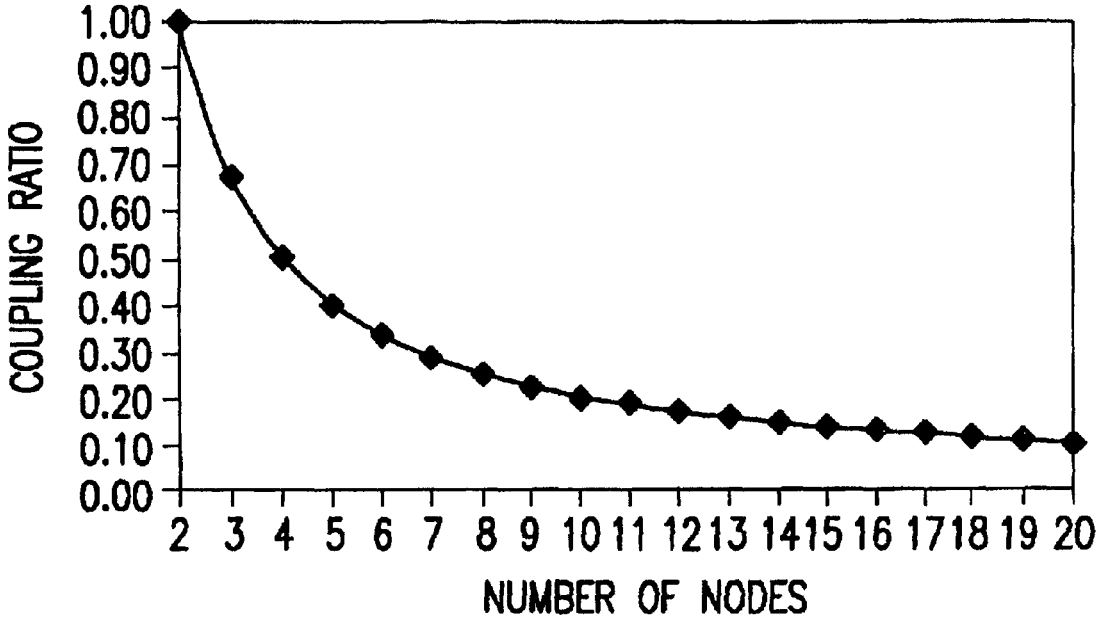
FIG. 6 is a plot showing the optimum in-line coupling $c_{opt}$ vs n, where n is the number of nodes.

Referring to FIG. 6, a plot is shown of the optimum in-line coupling $c_{opt}$ vs n, where n is the number of nodes. For the minimum number of two nodes, we find the optimum coupling ratio is 1, indicating all the light from node 1 transmitter is received at node 2 receiver. Since the maximum number of nodes the system 111 can sustain without optical amplifiers is approximately n less than or equal to 10, the best ratio is 80%, or alternatively, 20% is tapped from the bus signal at each node.

Figure 7:
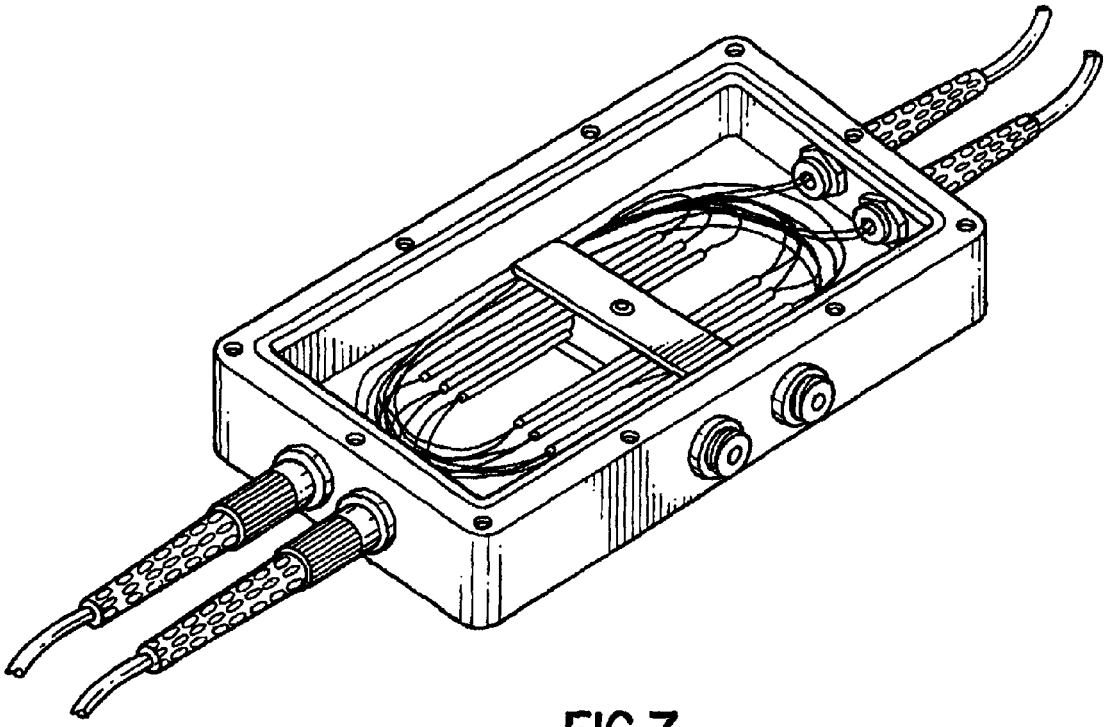
FIG. 7 is a perspective view illustrating a small rugged enclosure complete with moisture seals for ensures a benign mechanical environment for OBIM's.

As noted above, the OBIM 115 provides the optical interface between the avionics cable plant and the EOIC 117. A small rugged enclosure complete with moisture seals ensures a benign mechanical environment for the couplers, splices, and fiber pigtails and also provides an area for excess fiber storage and restraint to minimize fiber vibration and hence fracture and breakage. The proposed package shown in FIG. 7 is made of 6661T6 aluminum with machined grooves for capturing the couplers and fiber splices and a cross member to provide position stability. An "O" ring groove provides a vapor seal in conjunction with the aluminum cover secured by 10 machining screws. The enclosure body measure 4.5 inches in length by 2.5 inches wide and 1.0 inches high including the 0.10 inch thickness cover. Anodizing of the enclosure increases corrosion resistance.

Figure 8A:
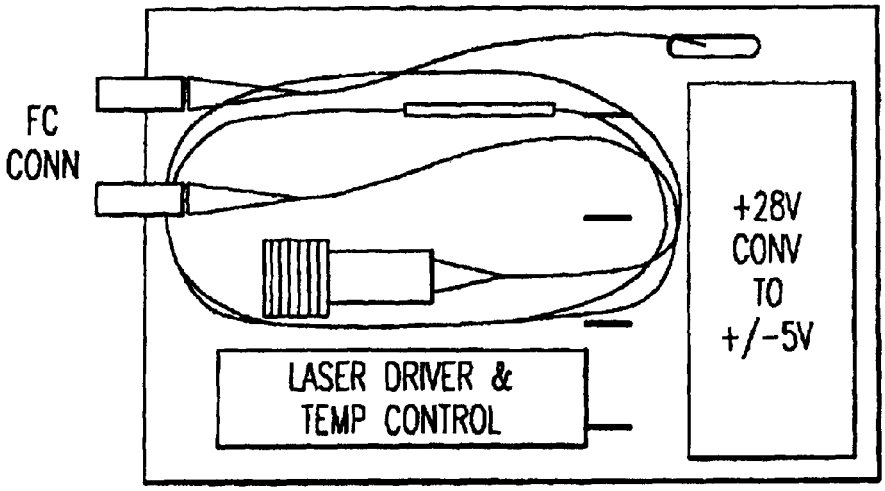
FIG. 8 illustrates component placement for a Mil_Std 1553 type card.
Figure 8B:
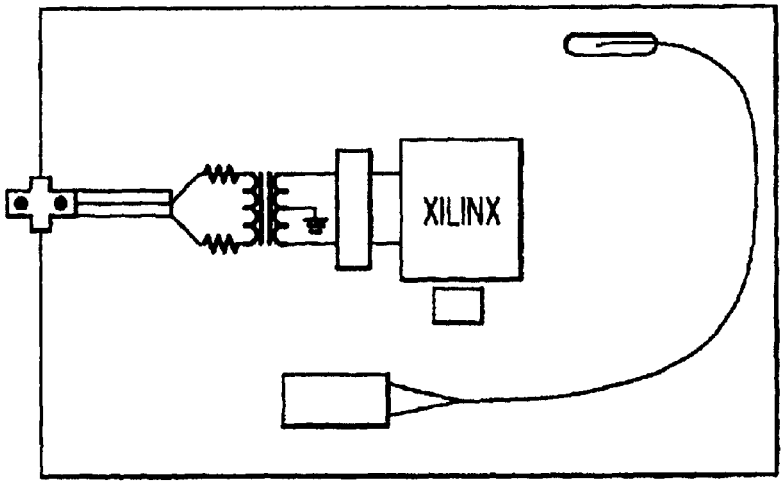

FIG. 8 illustrates component placement for a Mil_Std 1553 type card. The card size is approximately 6 inches by 4 inches and shows the location of all components identified with respect to the block diagram discussed above. Heat sinks are provided to dissipate heat generated by the thermoelectric devices bonded to the DFB lasers. Ample area for fiber pigtails avoid excess minimum bend radius requirements and tie down areas for the optical components allocated.

What is claimed is:

1. A bi-directional, redundant, optical transport system configured to provide a non-blocking, bi directional, multichannel, protocol independent optical transport system for the simultaneous transfer of digital, analog, and discrete data between a plurality data terminal equipment, the optical transport system comprising:

light transmission line for transmitting light bi-directionally;

a plurality of nodes, connected in series by the light transmission line for receiving, extracting and passing signal light, each node comprising:

data terminal equipment for issuing and receiving electrical signals;

an electro-optical interface device, associated the data terminal equipment, for converting electrical signals issued by the associated data terminal to it signal light for insertion onto the light transmission light and for converting signal light, extracted from the light transmission line into electrical signals to be received by the associated data terminal;

a translation logic device connected between the electrical optical interface device and the data terminal equipment, for performing required protocol translation for the data terminal equipment an optical interface device, connected to the electro-optical interface device and the light transmission line, for extracting signal light from the light transmission line to be converted into electrical signals by the electro-optical interface device for receipt by the data terminal equipment, for inserting, onto the light transmission line, signal light received from the electro-optical interface device and for passing signal light bi-directionally on the light transmission line;

a pump source for inserting excitation light onto the light transmission line;

an optical amplifier connector fiber connecting the each of the optical interface devices serially to one another, wherein the optical amplifier connector fiber is doped with a material which is excited by the excitation light and which emits light having a same wavelength as the light signals when radiated with light signals transmitted bi-directionally by the at least one fiber optic line.

2. An optical transport system according to claim 1, wherein the data terminal equipment comprises one of a computer, video or telephone device, having different protocol requirements.

3. An optical transport system according to claim 1, wherein the pump source is a pump laser which emits excitation light.

4. An optical transport system according to claim 3, wherein the excitation light emitted by the pump laser has a wavelength of about 980 nm.

5. An optical transport system according to claim 4, wherein the signal light has a wavelength of about 1550 nm.

6. An optical transport system according to claim 5, wherein the connector fiber is doped with erbium.

7. An optical transport system according to claim 6, wherein the length of the optical amplifier connector fiber is set as a function of the amount of amplification required.

8. An optical transport system according to claim 7, wherein the length of the optical amplifier connector fiber is about two meters.

9. An optical transport system according to claim 1, wherein the optical interface device comprising:

a first optical coupler for receiving signal light to be inserted onto or extracted from the light transmission line; and a fiber optic-line, optical coupler, coupled to the light transmission line and to the first optical coupler, for passing light on the light transmission line, for receiving light from the first optical coupler to be inserted onto the light transmission line and transmitting said received light in opposite directions on the light transmission line, and for extracting light from opposite directions on the light transmission line and transmitting said extracted light to the first optical coupler.

10. An optical transport system according to claim 9 wherein the first optical coupler is a four port, bi-directional optical coupler.

11. An optical transport system according to claim 10, wherein the first optical coupler has:

first and second ports for receiving light to be inserted onto the light transmission line and for transmitting light extracted from the light transmission line, and third and fourth ports each respectively connected to the fiber optic-line, optical coupler;

wherein light received by at least one of the first and second ports is split by the first optical coupler and transmitted by both the third and fourth ports to the light transmission line in opposite directions by the fiber optic-line, optical coupler; and wherein light extracted from the light transmission line by the fiber optic-line, optical coupler and received by at least one of the third and fourth ports is split by the first optical coupler and transmitted by the both the first and second ports.

12. An optical transport system according to claim 11, wherein the fiber optic-line, optical coupler is a pair of fiber optic-line, optical couplers comprising first and second fiber optic-line, optical couplers, the first fiber optic-line, optical coupler comprising:

a first port for receiving light transmitted in a first direction on the light transmission line and for transmitting light received from either the second fiber optic-line, optical couplers or the first optical coupler to the light transmission line in a second direction opposite to said first direction;

a second port for transmitting light received from the light transmission line in said first direction by the first port to the second fiber optic-line, optical coupler and for receiving light in said second direction from the second fiber optic-line, optical coupler; and a third port for transmitting light received from the light transmission line by the first port in the first direction to the first optical coupler;

wherein light received by the first port of the first fiber optic-line, optical coupler is split by the first fiber optic-line, optical coupler and transmitted by both the second and third ports; and the second fiber optic-line coupler comprising:

a fourth port for receiving light transmitted in the second direction on the light transmission line and for transmitting light received from first optic line optical coupler or the first optical coupler to the light transmission line in the first direction;

a fifth port for transmitting light received from the light transmission line in second direction by the fourth port to the first fiber optic-line, optical coupler and for receiving light in the first direction from the first fiber optic-line, optical coupler; and a sixth port for transmitting light received from the light transmission line in the first direction by the fourth port to the first optical coupler;

wherein light received by the fourth port to the second fiberoptic-line, optical coupler is split by the second fiber optic-line, optical coupler and transmitted by both the fifth and sixth ports.

13. An optical transport system according to claim 1, wherein the light transmission line comprises first and second fiber optic lines.

14. An optical transport system according to claim 13, wherein the optical interface device comprises:

a first optical coupler for receiving light to be inserted onto or extracted from the first fiber optic line;

a pair of first fiber optic-line, optical couplers, each coupled to the first fiber optic line and to the first optical coupler, for passing light on the first fiber optic line, for receiving light from the first optical coupler to be inserted onto the first fiber optic line and transmitting said received light in opposite directions on the first fiber optic line, and for extracting light from opposite directions on the first fiber optic line and transmitting said extracted light to the first optical coupler;

a second optical coupler for receiving light to be inserted onto or extracted from the second fiber optic line; and a pair of second fiber optic-line, optical couplers, each coupled to the second fiber optic line and to the second optical coupler, for passing light on the second fiber optic line, for receiving light from the second optical coupler to be inserted onto the second fiber optic line and transmitting said received signal in opposite directions on the second fiber optic line, and for extracting light from opposite directions on the second fiber optic line and transmitting said extracted light to the second optical coupler.

15. An optical transport system according to claim 14, wherein the first and second optical couplers are each a four port, bidirectional optical coupler.

16. An optical transport system according to claim 15, wherein the first optical coupler has:

first and second ports for receiving light to be inserted onto the first fiber optic line and for transmitting light extracted from the first fiber optic line, and third and fourth ports each respectively connected to one of the pair of first fiber optic-line, optical couplers;

wherein light received by at least one of the first and second ports is split by the first optical coupler and transmitted by both the third and fourth ports in opposite directions on the first fiber optic line by the pair of first optic line optical couplers; and wherein light extracted from the first optic line and received by at least one of the third and fourth ports is split by the first optical coupler and transmitted by the both the first and second ports; and wherein the second optical coupler has:

first and second ports for receiving light to be inserted onto the second fiber optic line and for transmitting light extracted from the second fiber optic line, and third and fourth ports each respectively connected to one of the pair of second fiber optic-line, optical couplers;

wherein light received by at least one of the first and second ports is split by the second optical coupler and transmitted by both the third and fourth ports to the second fiber optic line in opposite directions by the pair of second fiber optic-line, couplers; and wherein light extracted from the second fiber optic line and received by at least one of the third and fourth ports is split by the second optical coupler and transmitted by the both the first and second ports.

17. An optical transport system according to claim 16, wherein the pair of first fiber optic-line, optical couplers comprise first and second fiber optic-line, optical couplers, the first fiber optic-line, optical coupler comprising:

a first port for receiving light transmitted in a first direction on the first fiber optic line and for transmitting light received from either the second fiber optic-line, optical coupler or the first optical coupler to the first fiber optic line in a second direction opposite to said first direction;

a second port for transmitting light received from the first fiber optic line in said first direction by the first port to the second fiber optic-line, optical coupler and for receiving light in said second direction from the second fiber optic-line, optical coupler; and a third port for transmitting light received from the first fiber optic line by the first port in the first direction to the first optical coupler;

wherein light received by the first port of the first fiber optic-line, optical coupler is split by the first fiber optic-line, optical coupler and transmitted by both the second and third ports; and the second fiber optic-line, optical coupler comprising:

a fourth port for receiving light transmitted in the second direction on the first fiber optic line and for transmitting light received from first optic line optical coupler or the first optical coupler to the first fiber optic line in the first direction;

a fifth port for transmitting light received from the first fiber optic line in second direction by the fourth port to the first fiber optic-line, optical coupler and for receiving light in the first direction from the first fiber optic-line, optical coupler; and a sixth port for transmitting light received from the first fiber optic line in the first direction by the fourth port to the first optical coupler;

wherein light received by the fourth port of the second fiber optic-line, optical coupler is split by the second fiber optic-line, optical coupler and transmitted by both the fifth and sixth ports; and wherein the pair of second fiber optic-line, optical couplers comprise third and fourth fiber optic-line, optical couplers, the third fiber optic-line, optical coupler comprising:

a first port for receiving light transmitted in a first direction on the second fiber optic line and for transmitting light received from either the fourth fiber optic-line, optical coupler or the second optical coupler to the second fiber optic line in a second direction opposite to said first direction;

a second port for transmitting light received form the second fiber optic line in said first direction by the first port to the fourth fiber optic-line, optical coupler and for receiving light in said second direction from the fourth fiber optic-line, optical coupler; and a third port for transmitting light received from the second fiber optic line by the first port in the first direction to the second optical coupler;

wherein light received by the first port of the third fiber optic-line, optical coupler is split by the third fiber optic-line, optical coupler and transmitted by both the second and third ports; and the fourth fiber optic-line, optical coupler comprising:

a fourth port for receiving light transmitted in the second direction on the second fiber optic line and for transmitting light received from third optic line optical coupler or the second optical coupler to the second fiber optic line in the first direction;

a fifth port for transmitting light received by the fourth port from the second fiber optic line in second direction to the third fiber optic-line, optical coupler and for receiving light in the first direction from the third fiber optic-line, optical coupler; and a sixth port for transmitting light received from the second fiber optic line in the first direction by the fourth port to the second optical coupler;

wherein light received by the fourth port of the fourth fiber optic-line, optical coupler is split by the fourth fiber optic-line, optical coupler and transmitted by both the fifth and sixth ports.

18. An optical transport device according to claim 1, wherein the light transmission line comprises more than two fiber optical lines.

*19. A bi-directional optical transport system for passing optical signals, comprising:*

*an optical bus for permitting bi-directional transmission of the optical signals;*

*an electrical-to-optical converter for converting electrical communication signals received from first terminal equipment into optical communication signals;*

*a first passive optical interface device coupled to the optical bus for routing the optical communication signals*

*received from the electrical-to-optical converter onto the optical bus in both directions and for permitting the optical signals traveling along the optical bus to pass by in both directions;*

*a second passive optical interface device coupled to the optical bus for routing the optical communication signals traveling along the bus to an optical-to-electrical converter and for permitting the optical signals traveling along the optical bus to pass by in both directions;*

*a fiber optical amplifier for performing bi-directional amplification of the optical signals; and*

*the optical-to-electrical converter for receiving the optical communication signals from the second passive optical interface device and for converting the optical communication signals into the electrical communication signals, the optical-to-electrical converter for providing the electrical communication signals to second terminal equipment.*

*20. The optical transport system as set forth in claim 19, wherein the optical bus comprises a fiber optic line.*

*21. The optical transport system as set forth in claim 20, further comprising a second fiber optic line wherein the second fiber optic line is a redundant optical bus.*

*22. The optical transport system as set forth in claim 19, wherein the optical bus is a broken ring.*

*23. The optical transport system as set forth in claim 19, further comprising a second optical-to-electrical converter for converting optical signals, received from the first passive optical interface device over the optical bus, into electrical signals.*

*24. The optical transport system as set forth in claim 23, wherein the second optical-to-electrical converter is for providing the electrical signals to the first terminal equipment.*

*25. The optical transport system as set forth in claim 23, wherein the second optical-to-electrical converter is for providing the electrical signals to third terminal equipment.*

*26. The optical transport system as set forth in claim 19, further comprising a second electrical-to-optical converter for converting second electrical communication signals into second optical communication signals and for providing the second optical communication signals to the second passive optical interface device, the second passive optical interface device for routing the second optical communication signals received from the second electrical to-optical converter onto the optical bus in both directions.*

*27. The optical transport system as set forth in claim 19, wherein the optical amplifier comprises a fiber amplifier.*

*28. The optical transport system as set forth in claim 27, wherein the fiber amplifier comprise a rare earth doped fiber amplifier.*

*29. The optical transport system as set forth in claim 27, further comprising a pump source for emitting an excitation light received by the optical amplifier.*

*30. The optical transport system as set forth in claim 19, wherein the optical amplifier is located along the optical bus.*

*31. The optical transport system as set forth in claim 19, wherein the optical amplifier is located between the electrical-to-optical converter and the first passive optical interface device.*

*32. The optical transport system as set forth in claim 19, wherein the optical amplifier is located between the second passive optical interface device and the optical-to-electrical converter.*

*33. The optical transport system as set forth in claim 19, wherein the optical communication signals and optical signals are wavelength division multiplexed and the second passive optical interface device includes a wavelength division multiplexer.*

*34. The optical transport system as set forth in claim 19, wherein the first and second passive optical interface devices comprise taps for diverting a fraction of the optical signals and optical communication signals to the optical-to-electrical converter.*

*35. The optical transport system as set forth in claim 19, wherein the second passive optical interface device comprises a tunable filter for filtering the optical communication signals from the optical signals on the bus.*

*36. The optical transport system as set forth in claim 19, wherein the second passive optical interface device includes a filter for filtering the optical communication signals from the optical signals on the bus.*

*37. The optical transport system as set forth in claim 19, wherein the electrical-to-optical converter comprises a directly modulated optical source.*

*38. The optical transport system as set forth in claim 19, wherein the optical-to-electrical converter generates the electrical signals in Mil_Std 1553 protocol.*

*39. The optical transport system as set forth in claim 19, wherein the optical-to-electrical converter generates the electrical signals in ARINC 429 protocol.*

*40. The optical transport system as set forth in claim 19, wherein the electrical communication signals comprise tri-level electrical signals, the optical signals comprise bi-level optical signals, the electrical-to-optical converter converts the tri-level electrical signals into bi-level optical signals, and the optical-to-electrical converter converts the bi-level optical signals into the tri-level electrical signals.*

*41. The optical transport system as set forth in claim 19, further comprising the first terminal equipment.*

*42. The optical transport system as set forth in claim 41, wherein the first terminal equipment comprises video equipment and the electrical communication signals comprise video signals.*

*43. The optical transport system as set forth in claim 41, wherein the first terminal equipment comprises a sensor and the electrical communication signals comprise data signals.*

*44. The optical transport system as set forth in claim 19, wherein the electrical communication signals comprise radio frequency signals.*

*45. The optical transport system as set forth in claim 19, wherein the electrical communication signals comprise Ethernet signals.*

*46. The optical transport system as set forth in claim 19, wherein the electrical communication signals comprise digital signals.*

*47. The optical transport system as set forth in claim 19, wherein the electrical communication signals comprise analog signals.*

*48. The optical transport system as set forth in claim 19, wherein the electrical communication signals comprise discrete signals.*

*49. The optical transport system as set forth in claim 41, wherein the first terminal equipment comprises an input device and the electrical communication signals comprise control signals.*

*50. The optical transport system as set forth in claim 41, wherein the first terminal equipment comprises a workstation.*

*51. The optical transport system as set forth in claim 41, further comprising a translation logic device connected between the first terminal equipment and the first passive optical interface device for performing protocol translation.*

*52. The optical transport system as set forth in claim 19, further comprising the second terminal equipment.*

*53. The optical transport system as set forth in claim 19, wherein the optical bus forms a ring topology.*

*54. The optical transport system as set forth in claim 19, wherein the electrical-to-optical converter comprises a tuneable laser.*

*55. A structure equipped with an optical transport system enabling optical communications over an optical bus, comprising:*

*the structure;*

*the optical bus for permitting bi-directional transmission of the optical signals, wherein the optical bus is contained at least in part within the structure;*

*first terminal equipment located within the structure for generating electrical communication signals;*

*an electrical-to-optical converter located within the structure for converting the electrical communication signals received from the first terminal equipment into optical communication signals;*

*a first passive optical interface device located within the structure and coupled to the optical bus for routing the optical communication signals received from the electrical-to-optical converter onto the optical bus in both directions and for permitting the optical signals traveling along the optical bus to pass by in both directions;*

*a fiber optical amplifier located within the structure for performing bi-directional amplification of the optical signals;*

*a second passive optical interface device located within the structure and coupled to the optical bus for routing the optical communication signals traveling along the bus to an optical-to-electrical converter and for permitting the optical signals traveling along the optical bus to pass by in both directions;*

*the optical-to-electrical converter for receiving the optical communication signals from the second passive optical interface device and for converting the optical communication signals into the electrical communication signals; and*

*second terminal equipment located within the structure for receiving electrical communication signals from the optical-to-electrical converter.*

*56. The structure as set forth in claim 55, wherein the structure comprises a vehicle.*

*57. The structure as set forth in claim 55, wherein the structure comprises avionics.*

*58. A method for transporting optical signals over an optical bus between first and second nodes, comprising:*

*generating electrical communication signals at first node;*

*converting the electrical communication signals into optical communication signals;*

*passively splitting the optical communication signals into two components;*

*routing the two components of the optical communication signals at a first location along the optical bus and permitting the optical signals already on the optical bus traveling in both directions to be passively routed past the first location, the routing involving directing the two components of the optical communication signals in opposite directions along the optical bus and combining the two components with any optical signals already on the optical bus;*

*at a second location along the optical bus, passively diverting at least some of the optical signals on the bus traveling in both directions toward a second node, wherein the diverting includes permitting the optical signals traveling in both directions to be passively routed past the second location;*

*converting the optical signals diverted toward the second node into corresponding electrical signals, with the electrical signals including the electrical communication signals generated at the first node;*

*sending the corresponding electrical communication signals to a translation logic device for performing protocol translation; and*

*amplifying the optical signals traveling in both directions between the first node and the second node, wherein the amplifying is performed passively and is for compensating for at least some of the losses associated with diverting the optical signals toward the second node and for losses associated the optical bus.*

*59. The method as set forth in claim 58, further comprising:*

*generating second electrical communication signals at the second node;*

*converting the second electrical communication signals into second optical communication signals;*

*passively splitting the second optical communication signals into two components of the second optical communication signals;*

*routing the two components of the second optical communication signals at the second location along the optical bus and permitting the optical signals already on the optical bus traveling in both directions to be passively routed pass the second location, the routing involving directing the two components of the second optical communication signals in opposite directions along the optical bus and combining the two components of the second optical communication signals with any optical signals already on the optical bus; and*

*at a third location along the optical bus, passively diverting at least some of the optical signals on the bus traveling in both directions toward a third node, wherein the diverting includes permitting the optical signals traveling in both directions to be passively routed past the third location.*

*60. The method as set forth in claim 59, wherein generating the second electrical communication signals at the second node and converting the optical signals diverted toward the second node into corresponding electrical signals occur simultaneously.*

*61. The method as set forth in claim 58, further comprising sending the corresponding electrical communication signals to terminal equipment.*

*62. The method as set forth in claim 61, wherein sending comprises sending the corresponding electrical communication signals to a plurality of terminal equipment.*

*63. The method as set forth in claim 58, wherein passively diverting at the second location comprises selecting optical signals as a set of wavelengths.*

*64. The method as set forth in claim 58, wherein passively diverting at the second location comprises diverting a fraction of the optical signals at all wavelengths.*

*65. The method as set forth in claim 58, wherein passively diverting at the second location comprises selectively tuning a filter to a desired wavelength to select optical signals at that desired wavelength.*

*66. The method as set forth in claim 58, further comprising providing a back up optical bus.*

*67. A method of transporting optical signals between nodes, comprising:*

*providing a bi-directional optical bus, the bi-directional optical bus permitting bi-directional communication between any of the nodes;*

*passively diverting at least part of the optical signals traveling along the bus in both directions toward each node;*

*converting electrical signals generated at any of the nodes into converted optical signals;*

*separating the converted optical signals into two components and passively combining the two components of the converted optical signals with the optical signals traveling in both directions along the optical bus, wherein the passively combining involves directing the two components of the converted optical signals in opposite directions along the optical bus;*

*receiving at each node at least part of the optical signals traveling along the optical bus;*

*at the nodes, converting the received optical signals back into corresponding the electrical signals;*

*operating at least some of the nodes in full duplex such that each node can simultaneously transmit optical signals and receive optical signals from another node; and*

*providing passive amplification of the optical signals traveling along the optical bus, the passive amplification being bi-directional and compensating at least for some of the losses associated with passively diverting the optical signals to each node and for losses associated with the optical bus;*

*wherein by passively diverting optical signals from the optical bus to each node and by passively combining the two components of converted optical signals from each node onto the optical bus, each node can transmit optical signals to any other node and also receive optical signals from any other node.*

*68. The method as set forth in claim 67, wherein receiving at each node at least part of the optical signals traveling along the optical bus comprises selecting optical signals having only certain wavelengths.*

*69. The method as set forth in claim 67, wherein receiving at each node at least part of the optical signals traveling along the optical bus comprises filtering out a group of the optical signals.*

*70. The method as set forth in claim 67, wherein receiving at each node at least part of the optical signals traveling along the optical bus comprises wavelength division multiplexing the optical signals on the bus.*

*71. The method as set forth in claim 67, further comprising providing a back up bi-directional optical bus.*

*72. An optical transport system enabling optical communications between terminal equipment, comprising:*

*an optical bus for permitting bi-directional transmission of the optical signals;*

*first terminal equipment for generating electrical communication signals;*

*an electrical-to-optical converter for converting the electrical communication signals received from the first terminal equipment into optical communication signals;*

*a first passive optical interface device coupled to the optical bus at a first location for routing the optical communication signals received from the electrical-to-optical converter onto the optical bus in both directions and for permitting the optical signals traveling along the optical bus to pass by in both directions;*

*a second passive optical interface device coupled to the optical bus at a second location for routing the optical communication signals traveling along the bus to at least one optical-to-electrical converter and for permitting the optical signals traveling along the optical bus to pass by in both directions;*

*at least one optical-to-electrical converter for receiving the optical communication signals from the second passive optical interface device and for converting the optical communication signals into the electrical communication signals;*

*a plurality of terminal equipment for receiving the electrical communication signals from the at least one optical-to-electrical converter; and*

*a fiber optic amplifier for performing bi-directional amplification of the optical signals;*

*wherein electrical communication signals from first terminal equipment is transmitted over the bi-directional optical bus and can be received by at least one of the plurality of terminal equipment.*

*73. The optical transport system as set forth in claim 72, wherein the sytem includes a plurality of optical-to-electrical converters, each receiving the optical communication signals from the second passive optical interface device.*

*74. The optical transport system as set forth in claim 73, wherein the plurality of terminal equipment receive the electrical communication signals from a respective one of the plurality of optical-to-electrical converters.*

*75. The optical transport system as set forth in claim 72, wherein the plurality of terminal equipment receive the electrical communication signals from the one optical-to-electrical converter.*

*76. An optical system for communicating with at least one other system over a bi-directional optical bus, comprising:*

*an optical transmitter for receiving a first set of electrical signals and for producing a first set of optical signals;*

*a passive optical interface device for being coupled to the optical bus for routing the first set of optical signals received from the optical transmitter onto the optical bus in both directions and for permitting optical signals already traveling along the optical bus to pass by in both directions;*

*an optical receiver for receiving a second set of optical signals traveling along the optical bus from the passive optical interface device and for generating a second set of electrical signals; and*

*a fiber optical amplifier for performing bi-directional amplification of at least one of the first set and second set of optical signals;*

*wherein the optical amplifier is for compensating for at least some of the coupling losses associated with the passive optical interface device.*

*77. The optical communication system as set forth in claim 76, wherein the optical amplifier is placed between the optical transmitter and the passive optical interface device and compensates for coupling losses associated with routing the first set of optical signals in both directions along the optical bus.*

*78. The optical communication system as set forth in claim 76, wherein the optical amplifier is placed between the optical receiver and the passive optical interface device and amplifies the second set of optical signals.*

*79. The optical communication system as set forth in claim 76, wherein the optical amplifier is placed on the optical bus and is for amplifying the optical signals traveling along the optical bus.*

*80. The optical communication system as set forth in claim 76, wherein the passive optical interface device isolates the optical receiver from the optical transmitter such that the optical transmitter and optical receiver can operate in full duplex mode.*

*81. A structure equipped with an optical system for communicating with at least one other system over a bi-directional optical bus, comprising:*

*the structure;*

*an optical transmitter contained within the structure for receiving a first set of electrical signals and for producing a first set of optical signals;*

*a passive optical interface device contained within the structure for being coupled to the optical bus for routing the first set of optical signals received from the optical transmitter onto the optical bus in both directions and for permitting optical signals already traveling along the optical bus to pass by in both directions;*

*an optical receiver contained within the structure for receiving a second set of optical signals traveling along the optical bus from the passive optical interface device and for generating a second set of electrical signals; and*

*an optical amplifier contained within the structure for performing bi-directional amplification of at least one of the first set and second set of optical signals;*

*wherein the optical amplifier is for compensating for at least some of the coupling losses associated with the passive optical interface device and for losses associated with the bi-directional optical bus.*

*82. A method for communicating at a first node with a second node over a bi-directional optical bus, comprising:*

*generating a first set of electrical signals at the first node;*

*converting the first set of electrical signals into a first set of optical signals;*

*passively splitting the first set of optical communication signals into two components;*

*routing the two components of the first set of optical signals along the optical bus and permitting the optical signals already on the optical bus traveling in both directions to be passively routed pass the first node, the routing involving directing the two components of the first set of optical signals in opposite directions along the optical bus and combining the two components with any optical signals already on the optical bus;*

*passively diverting toward the first node, a second set of optical signals which are generated by the second node and which are on the bus traveling in both directions, wherein the diverting includes permitting at least some of the optical signals traveling in both directions to be passively routed past the first node;*

*converting the second set of optical signals into a second set of electrical signals; and*

*amplifying the optical signals traveling in both directions between the first node and the second node, wherein the amplifying is performed passively and is for compensating for at least some of the losses associated with diverting the optical signals toward the first node and for losses associated with routing the optical signals along the optical bus.*

* * * * *